(12) United States Patent
Panchaksharaiah et al.

(10) Patent No.: US 12,184,944 B1
(45) Date of Patent: Dec. 31, 2024

(54) SYSTEMS AND METHODS FOR ADDRESSING A CORRUPTED SEGMENT IN A MEDIA ASSET

(71) Applicant: Adeia Guides Inc., San Jose, CA (US)

(72) Inventors: Vishwas Sharadanagar Panchaksharaiah, Karnataka (IN); Vikram Makam Gupta, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/384,193

(22) Filed: Oct. 26, 2023

Related U.S. Application Data

(63) Continuation of application No. 18/093,949, filed on Jan. 6, 2023, now Pat. No. 11,843,831, which is a
(Continued)

(51) Int. Cl.
| | |
|---|---|
| *H04N 21/6375* | (2011.01) |
| *H04N 21/2343* | (2011.01) |
| *H04N 21/654* | (2011.01) |
| *H04N 21/658* | (2011.01) |
| *H04N 21/8549* | (2011.01) |

(52) U.S. Cl.
CPC .. *H04N 21/6375* (2013.01); *H04N 21/234336* (2013.01); *H04N 21/654* (2013.01); *H04N 21/658* (2013.01); *H04N 21/8549* (2013.01)

(58) Field of Classification Search
CPC ....... H04N 21/6375; H04N 21/234336; H04N 21/654; H04N 21/658; H04N 21/8549;
(Continued)

(56) References Cited

U.S. PATENT DOCUMENTS

| | | |
|---|---|---|
| 6,564,378 B1 | 5/2003 | Satterfield et al. |
| 7,165,098 B1 | 1/2007 | Boyer et al. |
| (Continued) | | |

FOREIGN PATENT DOCUMENTS

| | | |
|---|---|---|
| EP | 2775730 A1 | 9/2014 |
| JP | 2005130262 A | 5/2005 |

OTHER PUBLICATIONS

ISR and Written Opinion in PCT/US2017/020608 dated Dec. 1, 2017.

*Primary Examiner* — Cynthia M Fogg
(74) *Attorney, Agent, or Firm* — Haley Guiliano LLP

(57) ABSTRACT

Systems and methods for addressing a corrupted segment in a media asset. The media guidance application determines that a segment of a media asset is corrupted. The media guidance application determines whether a retrieval period to retrieve an uncorrupted copy of the segment exceeds a threshold period. If the retrieval period does not exceed the threshold period, the media guidance application retrieves and generates for display the uncorrupted copy of the segment. If the retrieval period exceeds the threshold period, the media guidance application determines whether an importance level of the corrupted segment exceeds a threshold level. If the importance level exceeds the threshold level, the media guidance application generates for display a summary for the corrupted segment. If the importance level does not exceed the threshold level, the media guidance application generates for display the subsequent segment and the summary for the corrupted segment in an overlay.

20 Claims, 11 Drawing Sheets

Related U.S. Application Data continuation of application No. 17/713,811, filed on Apr. 5, 2022, now Pat. No. 11,582,518, which is a continuation of application No. 17/165,050, filed on Feb. 2, 2021, now Pat. No. 11,323,775, which is a continuation of application No. 16/490,196, filed as application No. PCT/US2017/020608 on Mar. 3, 2017, now Pat. No. 10,939,172.

(58) Field of Classification Search
CPC ....... H04N 21/23418; H04N 21/44008; H04N 21/4622; H04N 21/4316; H04N 21/437; H04N 21/44209; H04N 21/4882; H04N 21/8456; H04N 21/858
USPC .......................................................... 725/14
See application file for complete search history.

(56) References Cited

U.S. PATENT DOCUMENTS

| | | |
|---|---|---|
| 7,761,892 B2 | 7/2010 | Ellis et al. |
| 8,046,801 B2 | 10/2011 | Ellis et al. |
| 8,719,891 B1 | 5/2014 | Aldrey et al. |
| 9,521,455 B1 | 12/2016 | Gupta et al. |
| 9,807,474 B2 | 10/2017 | Gibbon et al. |
| 10,003,420 B2 | 6/2018 | Long et al. |
| 10,939,172 B2 | 3/2021 | Panchaksharaiah et al. |
| 11,323,775 B2 | 5/2022 | Panchaksharaiah et al. |
| 11,582,518 B2 | 2/2023 | Panchaksharaiah et al. |
| 11,843,831 B2 | 12/2023 | Panchaksharaiah et al. |
| 2002/0174430 A1 | 11/2002 | Ellis et al. |
| 2005/0251827 A1 | 11/2005 | Ellis et al. |
| 2007/0168864 A1 | 7/2007 | Yamamoto et al. |
| 2009/0106804 A1* | 4/2009 | Bhogal .............. H04N 21/8456 725/110 |
| 2009/0213938 A1* | 8/2009 | Lee ........................ H04N 19/61 375/E7.076 |
| 2010/0153885 A1 | 6/2010 | Yates |
| 2013/0216207 A1 | 8/2013 | Berry et al. |
| 2016/0029074 A1 | 1/2016 | Jayamanne et al. |
| 2016/0371257 A1 | 12/2016 | Nishimura |
| 2016/0373194 A1* | 12/2016 | Long ................. H04N 21/2407 |
| 2017/0118523 A1* | 4/2017 | Gupta ................. H04N 21/278 |
| 2020/0014978 A1 | 1/2020 | Panchaksharaiah et al. |
| 2021/0185397 A1 | 6/2021 | Panchaksharaiah et al. |
| 2022/0303625 A1 | 9/2022 | Panchaksharaiah et al. |
| 2023/0224544 A1 | 7/2023 | Panchaksharaiah et al. |

\* cited by examiner

SYSTEMS AND METHODS FOR ADDRESSING A CORRUPTED SEGMENT IN A MEDIA ASSET

CROSS-REFERENCE TO RELATED APPLICATIONS

This application is a continuation of U.S. patent application Ser. No. 18/093,949, filed Jan. 6, 2023, which is a continuation of U.S. patent application Ser. No. 17/713,811, filed Apr. 5, 2022, now U.S. Pat. No. 11,582,518, which is a continuation of U.S. patent application Ser. No. 17/165,050, filed Feb. 2, 2021, now U.S. Pat. No. 11,323,775, which is a continuation of U.S. patent application Ser. No. 16/490,196, filed Aug. 30, 2019, now U.S. Pat. No. 10,939,172, which is a national stage application under 35 U.S.C. § 371 of International Application PCT/US2017/020608, filed Mar. 3, 2017, which are hereby incorporated by reference herein in their entireties.

BACKGROUND

Sometimes, while watching a program recorded on his or her digital video recorder (DVR), a user may encounter an error due to a segment of the program being corrupted. The corruption may have occurred due to a corrupted signal from the content provider (or an emergency broadcast signal replacing the program signal), improper local storage of that segment of the program, or the segment not having been stored at all. The user may skip to the next playable segment of the program but may miss an important event that occurred in the corrupted segment. Alternatively, the user may record another instance of the program broadcast at a later time. However, this may still hamper the user's enjoyment of the program due to the delay in having to wait to watch the program until the other instance has been recorded. Accordingly, there is a need for a system that evaluates different available options to address a corrupted segment and presents the best available option such that the user may continue to enjoy the program despite the corrupted segment.

SUMMARY

Systems and methods for addressing a corrupted segment in a media asset are described herein. The described systems and methods can address a corrupted segment of a program, a missing segment of programs, a missing episode in a program series, or another suitable deficiency that may hamper the user's enjoyment of the program. Conventional systems may allow a user to record a later instance of the program with the corrupted segment. Alternatively, conventional systems may attempt to retrieve the corrupted segment from another source. However, this process may take some time and delay the user's enjoyment of the program. Conventional systems do not consider different options such that the user may continue to enjoy the program despite the corrupted segment. Particularly, conventional systems do not evaluate different options to address a corrupted segment based on the importance of the corrupted segment and/or the delay in retrieving another copy of the corrupted segment. The described systems and methods address a corrupted segment in a media asset based on one or more factors such as the retrieval period needed to retrieve an uncorrupted copy of the segment, the importance level of the corrupted segment, and other suitable factors.

The systems and methods described herein may be implemented in an interactive media guidance application that is executed on control circuitry of one or more user devices and/or one or more servers. For example, the interactive media guidance application may be executed on control circuitry of a set-top box, a mobile phone, or another suitable user device. In another example, the interactive media guidance application may be executed on control circuitry of a set-top box and control circuitry of a mobile phone. Each user device may execute stand-alone instances of the interactive media guidance application or each user device may execute different portions of the interactive media guidance application.

Sometimes, a user watching a program recorded on his or her user equipment, e.g., a DVR, may encounter an error message that a segment of the recorded program is corrupted. The interactive media guidance application on the user equipment may skip to the next playable segment and continue generating the program for display. However, the user may miss an important scene and find that his or her viewing experience has been diminished. Other times, the user may be watching a live program and receive a corrupted signal for part of the broadcast due to bad weather or another reason that caused the signal to be corrupted. The missed segment of the program may again diminish the user's viewing experience of the program. Other times, the user may be binge-watching a program series and realize that one or more episodes in the program series are missing. For example, the user may have forgotten to record the missing episode. In another example, the missing episode may have been deleted automatically to make space. In yet another example, a technical malfunction may have caused recording of the missing episode to fail. If the missing episode is important to understanding the plot, the user's experience of viewing the program series may be diminished.

The interactive media guidance application may address the corrupted segment (or missing episode) based on a number of factors, such as the retrieval period needed to retrieve an uncorrupted copy of the segment (or missing episode), the importance level of the corrupted segment (or missing episode), the duration of the corrupted segment (or missing episode), the content of the corrupted segment (or missing episode) (e.g., including ads only or a majority of ads), the availability on video-on-demand, the availability of a textual/audio summary, and other suitable factors.

In some embodiments, when a user starts watching a recorded program, the interactive media guidance application may in advance automatically analyze the entire recorded program to check if any segments are corrupted. If one or more segments are corrupted, the interactive media guidance application may extract frames from segments immediately before and after the corrupted segment. The interactive media guidance application may transmit the extracted frames, a program identifier, a recording identifier, or other suitable information to a database. In some embodiments, when the user is watching a live program that is corrupted due to a bad signal, the interactive media guidance application may identify a start time and an end time of the segment corrupted due to the bad signal. The interactive media guidance application may transmit the start time, the end time, a program identifier, a recording identifier, or other suitable information to a database. In some embodiments, when the user is binge-watching a program series, the interactive media guidance application may in advance determine if any episode or any segment of an episode is missing. If an episode or a segment of an episode is missing, the interactive media guidance application may transmit segment information, a program identifier, a recording identifier, or other suitable information to a database.

The database receiving the above-mentioned information may execute one or more image processing and video processing algorithms on the original, uncorrupted program and utilize the program's metadata to determine the applicability of the factors relevant to the user's viewing experience. For example, the database may determine the duration of the corrupted segment, the content of the corrupted segment (e.g., percentage of ads, percentage of scenes, etc.), the importance of the corrupted segment, the availability of the corrupted segment from other sources, such as video-on-demand, the availability of a textual/audio summary of the corrupted segment, or other suitable factors. In one example, the summary of the corrupted segment may be retrieved from well-known/trusted websites (e.g., a television critic's review), the user's social networks, or created based on subtitles for the corrupted segment. In some embodiments, the database may determine the importance of the corrupted segment based on the user's profile. For example, if the user's profile indicates an interest in action scenes, the database may determine a high importance for a corrupted segment including an action scene.

If no data is available for the corrupted segment relating to the relevant factors, the interactive media guidance application may determine whether the user needs to know what happened in the corrupted segment or whether the user should skip the corrupted segment based on the program's metadata and the duration of the corrupted segment. For example, if the corrupted segment comprises a significant portion of the program, it is more likely that the corrupted segment includes one or more scenes that are important for the user to properly enjoy the program. In another example, if the corrupted segment is part of the series finale, it is more likely that the corrupted segment includes one or more scenes that are important for the user to properly enjoy the program.

The interactive media guidance application may receive the data on the relevant factors from the database. The interactive media guidance application may generate for display to the user information regarding one or more of the relevant factors. For example, the interactive media guidance application may generate information regarding the duration of the corrupted segment, the content of the corrupted segment (e.g., ads), the importance of the corrupted segment (e.g., a series finale), the availability of the corrupted segment from another source, such as video-on-demand, a textual/audio summary of the corrupted segment, and other suitable factors. In another example, the interactive media guidance application may determine that the user at least needs to view or listen to a summary of the corrupted segment before proceeding to view the rest of the program. In another example, the interactive media guidance application may determine that the user may proceed with viewing the rest of the program and generate the summary in an overlay on the program. In yet another example, the interactive media guidance application may determine that the user did not miss anything in the corrupted segment and that the user may proceed with directly viewing the rest of the program.

In some aspects, the systems and methods described herein address a corrupted segment in a program, e.g., a program recorded on a user's DVR, a program being received in real time from a content provider, or a program from another suitable source. While the user is watching the program, the interactive media guidance application may determine a segment of the program is corrupted. The interactive media guidance application may determine the corruption prior to the segment being generated for display. For example, the interactive media guidance application may make the determination while generating for display a segment prior to the corrupted segment. Alternatively or additionally, the interactive media guidance application may determine the corruption when generating the segment for display. The interactive media guidance application may determine corruption by comparing the last frame of the prior segment and the first frame of the current segment. If the two frames deviate by more than a threshold, e.g., 10%, 20%, or another suitable threshold, the interactive media guidance application may determine that the segment is corrupted.

If the segment is corrupted, the interactive media guidance application may terminate display of the segment of the media asset. The interactive media guidance application may transmit a request for an uncorrupted copy of the segment to an alternate source, e.g., a content provider website or another suitable source. The interactive media guidance application may receive a link to the uncorrupted copy of the segment from the website. The interactive media guidance application may initiate a session for retrieving the uncorrupted copy of the segment. Based on the session, the interactive media guidance application may determine a retrieval period for retrieving the uncorrupted copy of the segment. For example, the interactive media guidance application may determine the retrieval period by projecting an estimation based on how long it has taken to retrieve a given portion of the segment thus far.

If the retrieval period is less than or equal to a threshold, e.g., five seconds, 10 seconds, or another suitable threshold, the interactive media guidance application may retrieve the uncorrupted copy of the segment and generate for display the uncorrupted copy of the segment. If the retrieval period is greater than the threshold, the interactive media guidance application may terminate the session for retrieving the uncorrupted copy of the segment. The interactive media guidance application may instead generate a summary for display to the user.

The interactive media guidance application may retrieve a subtitle component for the program. The subtitle component may be retrieved from local storage, a content provider website, or another suitable source. The interactive media guidance application may determine a portion of the subtitles corresponding to the corrupted segment. For example, the interactive media guidance application may determine the portion of the subtitles corresponding to a starting time index and an ending time index for the corrupted segment. The interactive media guidance application may determine the summary for the corrupted segment based on the portion of the subtitles. For example, the interactive media guidance application may determine the summary by determining one or more central characters in the portion of the subtitles, extracting text from the portion relating to the one or more central characters, and merging the extracted text into the summary for the corrupted segment.

The interactive media guidance application may determine an importance level of the corrupted segment based on the summary. For example, the interactive media guidance application may determine the importance level of the corrupted segment by determining a length of the summary and assigning the importance level based on the length of the summary. In another example, the interactive media guidance application may determine the importance level of the corrupted segment by determining a number of central characters in the summary and assigning the importance level based on the number of central characters. The interactive media guidance application may determine whether the importance level of the corrupted segment exceeds a threshold level.

If the importance level is greater than the threshold level, the interactive media guidance application may generate for display the summary for the corrupted segment at a first time. For example, the interactive media guidance application may generate for display the summary for the corrupted segment at the first time by generating for display a textual version of the summary accompanied with a text-to-speech narration of the summary. In another example, the interactive media guidance application may generate for display the summary for the corrupted segment at the first time by generating for display a textual version of the summary for a fixed period of time. The interactive media guidance application may generate for display a subsequent segment of the media asset at a second time subsequent to the first time. For example, the interactive media guidance application may generate for display the subsequent segment of the media asset at the second time when at least one of a text-to-speech narration of the summary is complete and a textual version of the summary has been displayed for a fixed period of time.

If the importance level is less than or equal to the threshold level, the interactive media guidance application may generate for display the subsequent segment of the media asset. The interactive media guidance application, at a substantially same time as generating for display the subsequent segment, may generate for display the summary for the corrupted segment in an overlay on the subsequent segment of the media asset.

Conventional systems do not consider different options such that the user may continue to enjoy the program despite the corrupted segment. Particularly, conventional systems do not evaluate different options to address a corrupted segment based on the importance of the corrupted segment and/or the delay in retrieving another copy of the corrupted segment. The described systems and methods address a corrupted segment in a media asset based on one or more factors such as the retrieval period needed to retrieve an uncorrupted copy of the segment and the importance level of the corrupted segment.

In some aspects, the systems and methods described herein provide for an interactive media guidance application to address a corrupted segment in a media asset generated for display. The interactive media guidance application determines that a segment of a media asset being generated for display is corrupted. The interactive media guidance application determines whether a retrieval period to retrieve an uncorrupted copy of the segment exceeds a threshold period. Based on determining that the retrieval period does not exceed the threshold period, the interactive media guidance application retrieves and generates for display the uncorrupted copy of the segment. Based on determining that the retrieval period exceeds the threshold period, the interactive media guidance application determines whether an importance level of the corrupted segment exceeds a threshold level. Based on determining that the importance level of the corrupted segment exceeds the threshold level, the interactive media guidance application generates for display a summary for the corrupted segment at a first time and a subsequent segment of the media asset at a second time subsequent to the first time. Based on determining that the importance level of the corrupted segment does not exceed the threshold level, the interactive media guidance application generates for display at a substantially same time the subsequent segment of the media asset and the summary for the corrupted segment in an overlay on the subsequent segment of the media asset.

In some aspects, the systems and methods described herein provide for an interactive media guidance application to address a corrupted segment in a media asset generated for display. The interactive media guidance application generates for display a segment of a media asset. The interactive media guidance application determines that the segment of the media asset is corrupted. Based on determining that the segment is corrupted, the interactive media guidance application terminates the display of the segment of the media asset. The interactive media guidance application transmits, to a content source, a request for an uncorrupted copy of the segment. The interactive media guidance application receives, from the content source, a link to the uncorrupted copy of the segment. The interactive media guidance application initiates, based on the link, a session for retrieving the uncorrupted copy of the segment. The interactive media guidance application determines, based on the session, a retrieval period for retrieving the uncorrupted copy of the segment.

The interactive media guidance application determines whether the retrieval period exceeds a threshold period. Based on determining that the retrieval period does not exceed the threshold period, the interactive media guidance application retrieves the uncorrupted copy of the segment and generates for display the uncorrupted copy of the segment. Based on determining that the retrieval period exceeds the threshold period, the interactive media guidance application terminates, based on the link, the session for retrieving the uncorrupted copy of the segment. The interactive media guidance application retrieves, from the content source, a subtitle component for the media asset. The interactive media guidance application determines, from the subtitle component, a portion of the subtitles corresponding to the corrupted segment. The interactive media guidance application determines a summary for the corrupted segment based on the portion of the subtitles. The interactive media guidance application determines an importance level of the corrupted segment based on the summary. The interactive media guidance application determines whether the importance level of the corrupted segment exceeds a threshold level.

Based on determining that the importance level of the corrupted segment exceeds the threshold level, the interactive media guidance application generates for display the summary for the corrupted segment at a first time. The interactive media guidance application generates for display a subsequent segment of the media asset at a second time subsequent to the first time. Based on determining that the importance level of the corrupted segment does not exceed the threshold level, the interactive media guidance application generates for display the subsequent segment of the media asset. At a substantially same time as generating for display the subsequent segment, the interactive media guidance application generates for display the summary for the corrupted segment in an overlay on the subsequent segment of the media asset.

In some embodiments, the interactive media guidance application determines that the segment of the media asset is corrupted by performing the following steps. The interactive media guidance application receives, from the content source, a prior segment preceding the segment of the media asset. The interactive media guidance application extracts a last frame from the prior segment. The interactive media guidance application extracts an initial frame from the segment of the media asset. The interactive media guidance application determines a deviation between the last frame of the prior segment and the initial frame of the segment of the media asset. The interactive media guidance application determines that the deviation exceeds a threshold deviation. Based on determining that the deviation exceeds the threshold deviation, the interactive media guidance application determines that the segment of the media asset is corrupted.

In some embodiments, the interactive media guidance application determines, based on the session, the retrieval period for retrieving the uncorrupted copy of the segment by performing the following steps. The interactive media guidance application retrieves a portion of the uncorrupted copy of the segment. The interactive media guidance application tracks a partial period taken to retrieve the portion. The interactive media guidance application determines a retrieval rate based on the partial period taken to retrieve the portion. The interactive media guidance application determines the retrieval period as an estimation for retrieving a remaining portion of the uncorrupted copy of the segment according to the retrieval rate.

In some embodiments, the interactive media guidance application determines, from the subtitle component, the portion of the subtitles corresponding to the corrupted segment by determining a starting time index and an ending time index for the corrupted segment and determining, from the subtitle component, the portion of the subtitles between the starting time index and the ending time index.

In some embodiments, the interactive media guidance application determines the summary for the corrupted segment based on the portion of the subtitles by determining one or more central characters in the portion of the subtitles, extracting text from the portion relating to the one or more central characters, and merging the extracted text into the summary for the corrupted segment.

In some embodiments, the interactive media guidance application determines the importance level of the corrupted segment based on the summary by determining a length of the summary and assigning the importance level based on the length of the summary.

In some embodiments, the interactive media guidance application determines the importance level of the corrupted segment based on the summary by determining a number of central characters in the summary and assigning the importance level based on the number of central characters.

In some embodiments, the interactive media guidance application generates for display the summary for the corrupted segment at the first time by generating for display a textual version of the summary accompanied with a text-to-speech narration of the summary.

In some embodiments, the interactive media guidance application generates for display the summary for the corrupted segment at the first time by generating for display a textual version of the summary for a fixed period of time.

In some embodiments, the interactive media guidance application generates for display a subsequent segment of the media asset at the second time subsequent to the first time by generating for display the subsequent segment of the media asset at the second time when at least one of a text-to-speech narration of the summary is complete and a textual version of the summary has been displayed for a fixed period of time.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
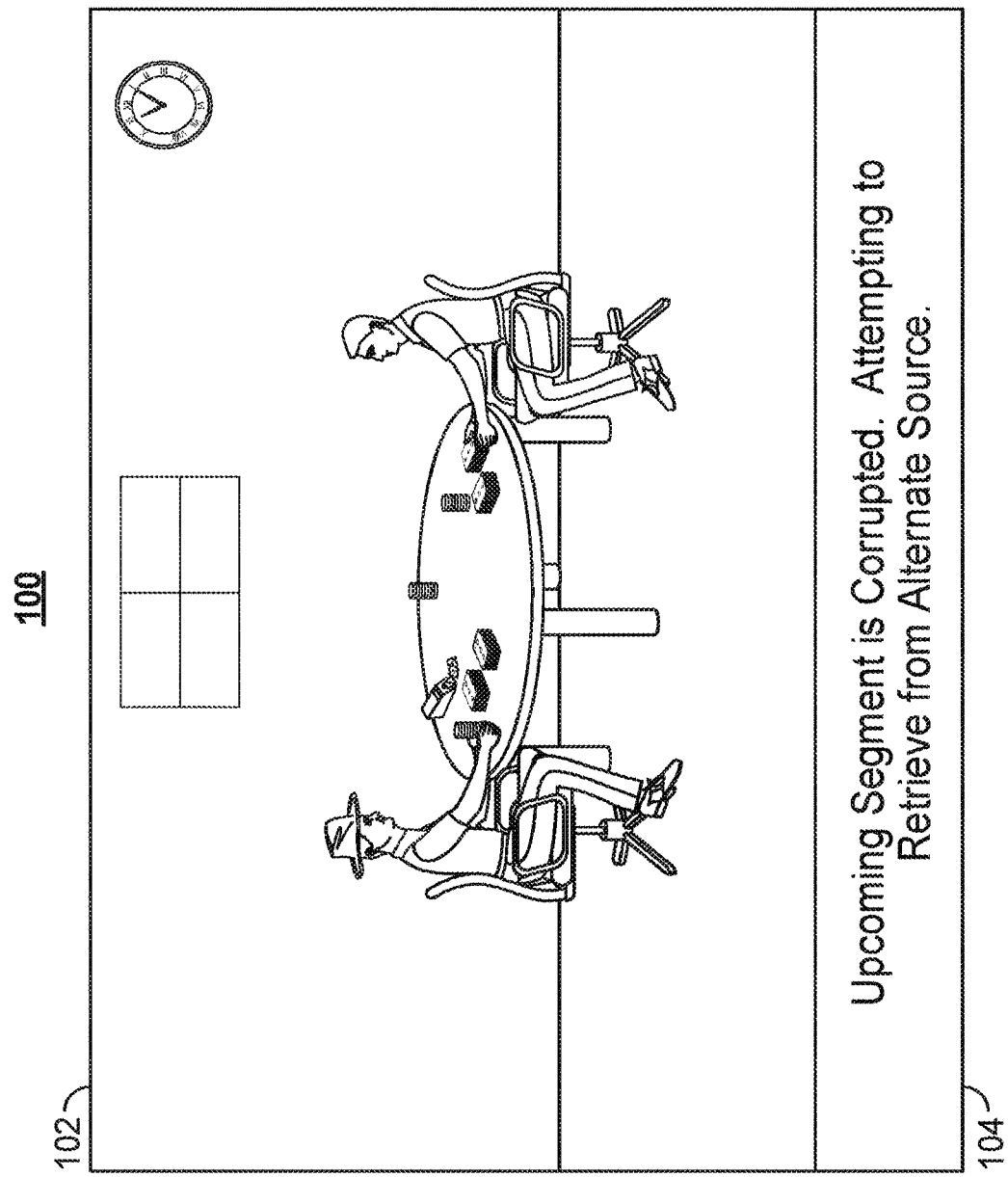
FIG. 1 shows an illustrative example of a display screen generated by a media guidance application in accordance with some embodiments of the disclosure.

Systems and methods for addressing a corrupted segment in a media asset are described. In some aspects, the media guidance application determines that a segment of a media asset is corrupted. The media guidance application determines whether a retrieval period to retrieve an uncorrupted copy of the segment exceeds a threshold period. If the retrieval period does not exceed the threshold period, the media guidance application retrieves and generates for display the uncorrupted copy of the segment. If the retrieval period exceeds the threshold period, the media guidance application determines whether an importance level of the corrupted segment exceeds a threshold level. If the importance level exceeds the threshold level, the media guidance application generates for display a summary for the corrupted segment. If the importance level does not exceed the threshold level, the media guidance application generates for display the subsequent segment and the summary for the corrupted segment in an overlay.

Conventional systems do not consider different options such that the user may continue to enjoy the program despite the corrupted segment. Particularly, conventional systems do not evaluate different options to address a corrupted segment based on the importance of the corrupted segment and/or the delay in retrieving another copy of the corrupted segment. The described systems and methods address a corrupted segment in a media asset based on one or more factors such as the retrieval period needed to retrieve an uncorrupted copy of the segment and the importance level of the corrupted segment.

The systems and methods described herein may be implemented in an interactive media guidance application that is executed on control circuitry of one or more user devices and/or one or more servers. For example, the interactive media guidance application may be executed on control circuitry of a set-top box, a mobile phone, or another suitable user device. In another example, the interactive media guidance application may be executed on control circuitry of a set-top box and control circuitry of a mobile phone. Each user device may execute stand-alone instances of the interactive media guidance application or each user device may execute different portions of the interactive media guidance application.

Sometimes, a user watching a program recorded on his or her user equipment, e.g., a DVR, may encounter an error message that a segment of the recorded program is corrupted. The interactive media guidance application on the user equipment may skip to the next playable segment and continue generating the program for display. However, the user may miss an important scene and find that his or her viewing experience has been diminished. Other times, the user may be watching a live program and receive a corrupted signal for part of the broadcast due to bad weather or another reason that caused the signal to be corrupted. The missed segment of the program may again diminish the user's viewing experience of the program. Other times, the user may be binge-watching a program series and realize that one or more episodes in the program series are missing. For example, the user may have forgotten to record the missing episode. In another example, the missing episode may have been deleted automatically to make space. In yet another example, a technical malfunction may have caused recording of the missing episode to fail. If the missing episode is important to understanding the plot, the user's experience of viewing the program series may be diminished.

The interactive media guidance application may address the corrupted segment (or missing episode) based on a number of factors, such as the retrieval period needed to retrieve an uncorrupted copy of the segment (or missing episode), the importance level of the corrupted segment (or missing episode), the duration of the corrupted segment (or missing episode), the content of the corrupted segment (or missing episode) (e.g., including ads only or a majority of ads), the availability on video-on-demand, the availability of a textual/audio summary, and other suitable factors.

In some embodiments, when a user starts watching a recorded program, the interactive media guidance application may in advance automatically analyze the entire recorded program to check if any segments are corrupted. If one or more segments are corrupted, the interactive media guidance application may extract frames from segments immediately before and after the corrupted segment. The interactive media guidance application may transmit the extracted frames, a program identifier, a recording identifier, or other suitable information to a database. In some embodiments, when the user is watching a live program that is corrupted due to a bad signal, the interactive media guidance application may identify a start time and an end time of the segment corrupted due to the bad signal. The interactive media guidance application may transmit the start time, the end time, a program identifier, a recording identifier, or other suitable information to a database. In some embodiments, when the user is binge-watching a program series, the interactive media guidance application may in advance determine if any episode or any segment of an episode is missing. If an episode or a segment of an episode is missing, the interactive media guidance application may transmit segment information, a program identifier, a recording identifier, or other suitable information to a database.

The database receiving the above-mentioned information may execute one or more image processing and video processing algorithms on the original, uncorrupted program and utilize the program's metadata to determine the applicability of the factors relevant to the user's viewing experience. For example, the database may determine the duration of the corrupted segment, the content of the corrupted segment (e.g., percentage of ads, percentage of scenes, etc.), the importance of the corrupted segment, the availability of the corrupted segment from other sources, such as video-on-demand, the availability of a textual/audio summary of the corrupted segment, or other suitable factors. In one example, the summary of the corrupted segment may be retrieved from well-known/trusted websites (e.g., a television critic's review), the user's social networks, or created based on subtitles for the corrupted segment. In some embodiments, the database may determine the importance of the corrupted segment based on the user's profile. For example, if the user's profile indicates an interest in action scenes, the database may determine a high importance for a corrupted segment including an action scene.

If no data is available for the corrupted segment relating to the relevant factors, the interactive media guidance application may determine whether the user needs to know what happened in the corrupted segment or whether the user should skip the corrupted segment based on the program's metadata and the duration of the corrupted segment. For example, if the corrupted segment comprises a significant portion of the program, it is more likely that the corrupted segment includes one or more scenes that are important for the user to properly enjoy the program. In another example, if the corrupted segment is part of the series finale, it is more likely that the corrupted segment includes one or more scenes that are important for the user to properly enjoy the program.

The interactive media guidance application may receive the data on the relevant factors from the database. The interactive media guidance application may generate for display to the user information regarding one or more of the relevant factors. For example, the interactive media guidance application may generate information regarding the duration of the corrupted segment, the content of the corrupted segment (e.g., ads), the importance of the corrupted segment (e.g., a series finale), the availability of the corrupted segment from another source, such as video-on-demand, a textual/audio summary of the corrupted segment, and other suitable factors. In another example, the interactive media guidance application may determine that the user at least needs to view or listen to a summary of the corrupted segment before proceeding to view the rest of the program. In another example, the interactive media guidance application may determine that the user may proceed with viewing the rest of the program and generate the summary in an overlay on the program. In yet another example, the interactive media guidance application may determine that the user did not miss anything in the corrupted segment and that the user may proceed with directly viewing the rest of the program.

Figure 2:
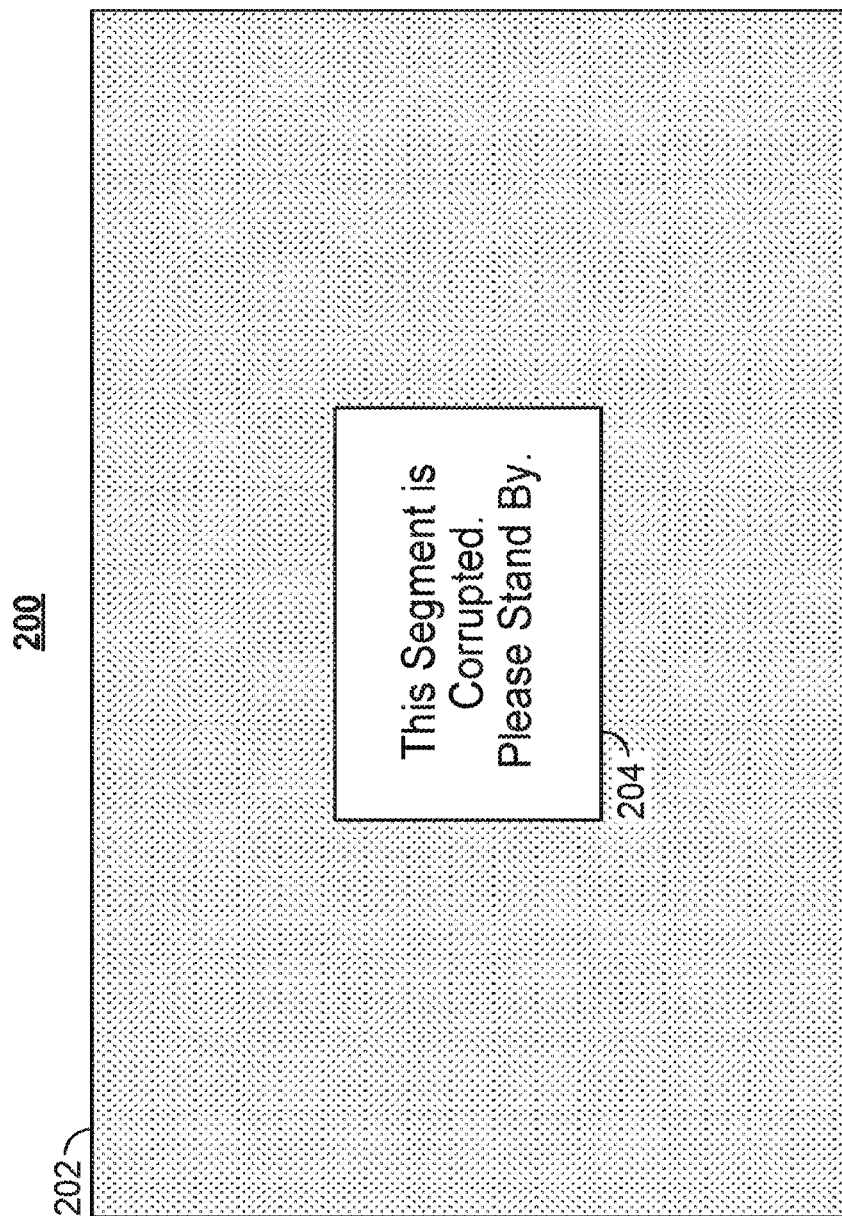
FIG. 2 shows another illustrative example of a display screen generated by a media guidance application in accordance with some embodiments of the disclosure.

FIGS. 1-5 show illustrative examples of display screens 100-500 generated by a media guidance application in accordance with some embodiments of the disclosure. In the illustrative examples, the systems and methods described herein address a corrupted segment in a program, e.g., a program recorded on a user's DVR, a program being received in real time from a content provider, or a program from another suitable source. While the user is watching the program, the interactive media guidance application may determine a segment of the program is corrupted. In FIG. 1, the interactive media guidance application determines the corruption prior to the segment being generated for display. The interactive media guidance application makes the determination while generating for display a segment 102 prior to the corrupted segment. The interactive media guidance application generates for display to the user a notification 104 that the upcoming segment is corrupted and that the interactive media guidance application is attempting to retrieve the segment from an alternate source. Alternatively or additionally, the interactive media guidance application may determine the corruption when generating the segment for display. In FIG. 2, the interactive media guidance application determines the segment 202 currently being generated for display is corrupted. The interactive media guidance application generates for display to the user a notification 204 that the current segment is corrupted and that the interactive media guidance application is attempting to address the corrupted segment. The interactive media guidance application may determine corruption by comparing the last frame of the prior segment and the first frame of the current segment. If the two frames deviate by more than a threshold, e.g., 10%, 20%, or another suitable threshold, the interactive media guidance application may determine that the segment is corrupted.

If the segment is corrupted, the interactive media guidance application may terminate display of the segment of the media asset. The interactive media guidance application may transmit a request for an uncorrupted copy of the segment to an alternate source, e.g., a content provider website or another suitable source. The interactive media guidance application may receive a link to the uncorrupted copy of the segment from the website. The interactive media guidance application may initiate a session for retrieving the uncorrupted copy of the segment. Based on the session, the interactive media guidance application may determine a retrieval period for retrieving the uncorrupted copy of the segment. For example, the interactive media guidance application may determine the retrieval period by projecting an estimation based on how long it has taken to retrieve a given portion of the segment thus far.

Figure 3:
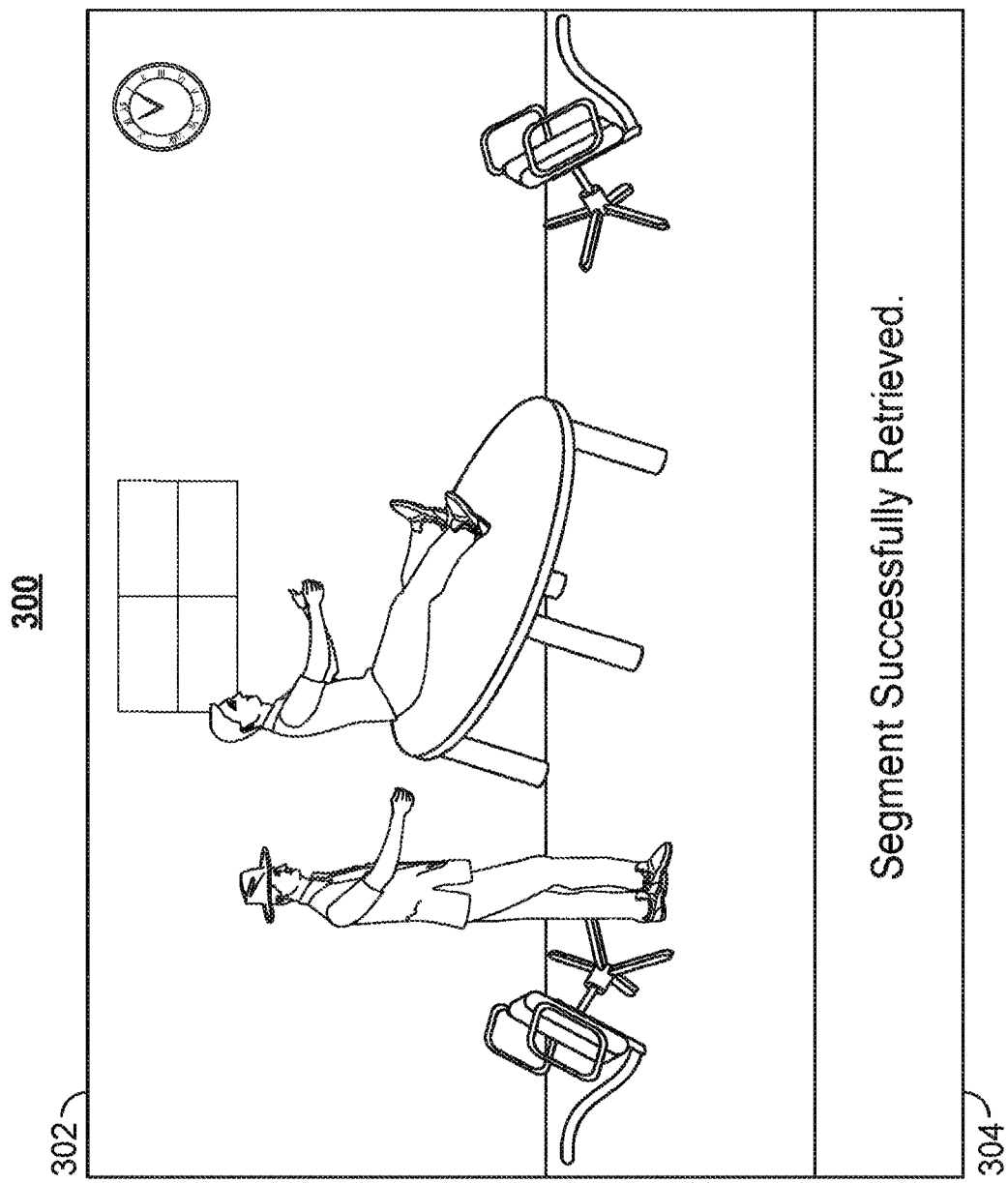
FIG. 3 shows yet another illustrative example of a display screen generated by a media guidance application in accordance with some embodiments of the disclosure.
Figure 4:
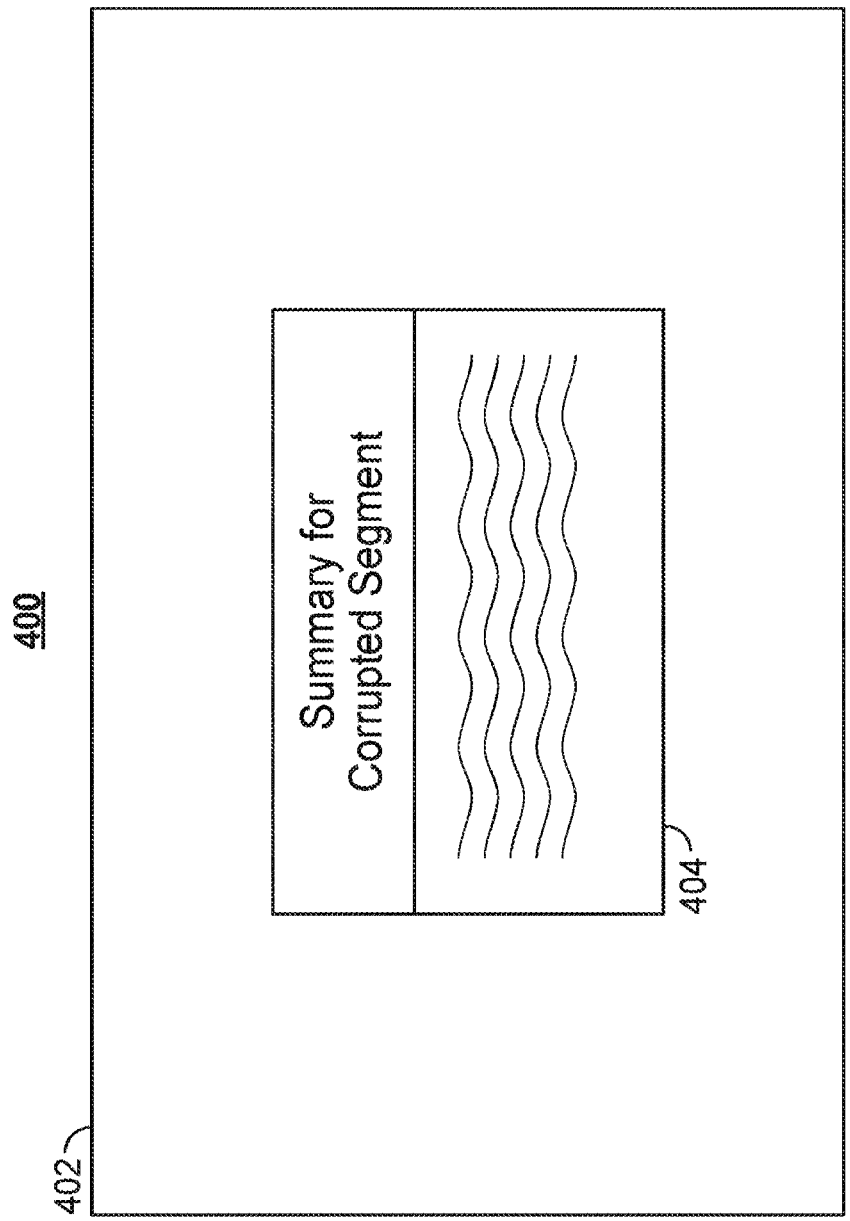
FIG. 4 shows yet another illustrative example of a display screen generated by a media guidance application in accordance with some embodiments of the disclosure.

If the retrieval period is less than or equal to a threshold, e.g., five seconds, 10 seconds, or another suitable threshold, the interactive media guidance application may retrieve the uncorrupted copy of the segment and generate for display the uncorrupted copy of the segment. In FIG. 3, the interactive media guidance application generates for display the uncorrupted copy of the segment 302. The interactive media guidance application generates for display to the user a notification 304 that the uncorrupted copy of the segment was successfully retrieved. If the retrieval period is greater than the threshold, the interactive media guidance application may terminate the session for retrieving the uncorrupted copy of the segment. The interactive media guidance application may instead generate a summary for display to the user. In FIG. 4, the interactive media guidance application generates for display a blank screen 402 and overlays the blank screen 402 with the summary of the corrupted segment 404.

The interactive media guidance application may retrieve a subtitle component for the program. The subtitle component may be retrieved from local storage, a content provider website, or another suitable source. The interactive media guidance application may determine a portion of the subtitles corresponding to the corrupted segment. For example, the interactive media guidance application may determine the portion of the subtitles corresponding to a starting time index and an ending time index for the corrupted segment. The interactive media guidance application may determine the summary for the corrupted segment based on the portion of the subtitles. For example, the interactive media guidance application may determine the summary by determining one or more central characters in the portion of the subtitles, extracting text from the portion relating to the one or more central characters, and merging the extracted text into the summary for the corrupted segment.

The interactive media guidance application may determine an importance level of the corrupted segment based on the summary. For example, the interactive media guidance application may determine the importance level of the corrupted segment by determining a length of the summary and assigning the importance level based on the length of the summary. In another example, the interactive media guidance application may determine the importance level of the corrupted segment by determining a number of central characters in the summary and assigning the importance level based on the number of central characters. The interactive media guidance application may determine whether the importance level of the corrupted segment exceeds a threshold level.

If the importance level is greater than the threshold level, the interactive media guidance application may generate for display the summary for the corrupted segment at a first time. For example, the interactive media guidance application may generate for display the summary for the corrupted segment at the first time by generating for display a textual version of the summary accompanied with a text-to-speech narration of the summary. In another example, the interactive media guidance application may generate for display the summary for the corrupted segment at the first time by generating for display a textual version of the summary for a fixed period of time. In FIG. 4, at the first time, the interactive media guidance application generates for display a blank screen 402 and overlays the blank screen 402 with the summary of the corrupted segment 404. The interactive media guidance application may generate for display a subsequent segment of the media asset at a second time subsequent to the first time. For example, the interactive media guidance application may generate for display the subsequent segment of the media asset at the second time when at least one of a text-to-speech narration of the summary is complete and a textual version of the summary has been displayed for a fixed period of time.

Figure 5:
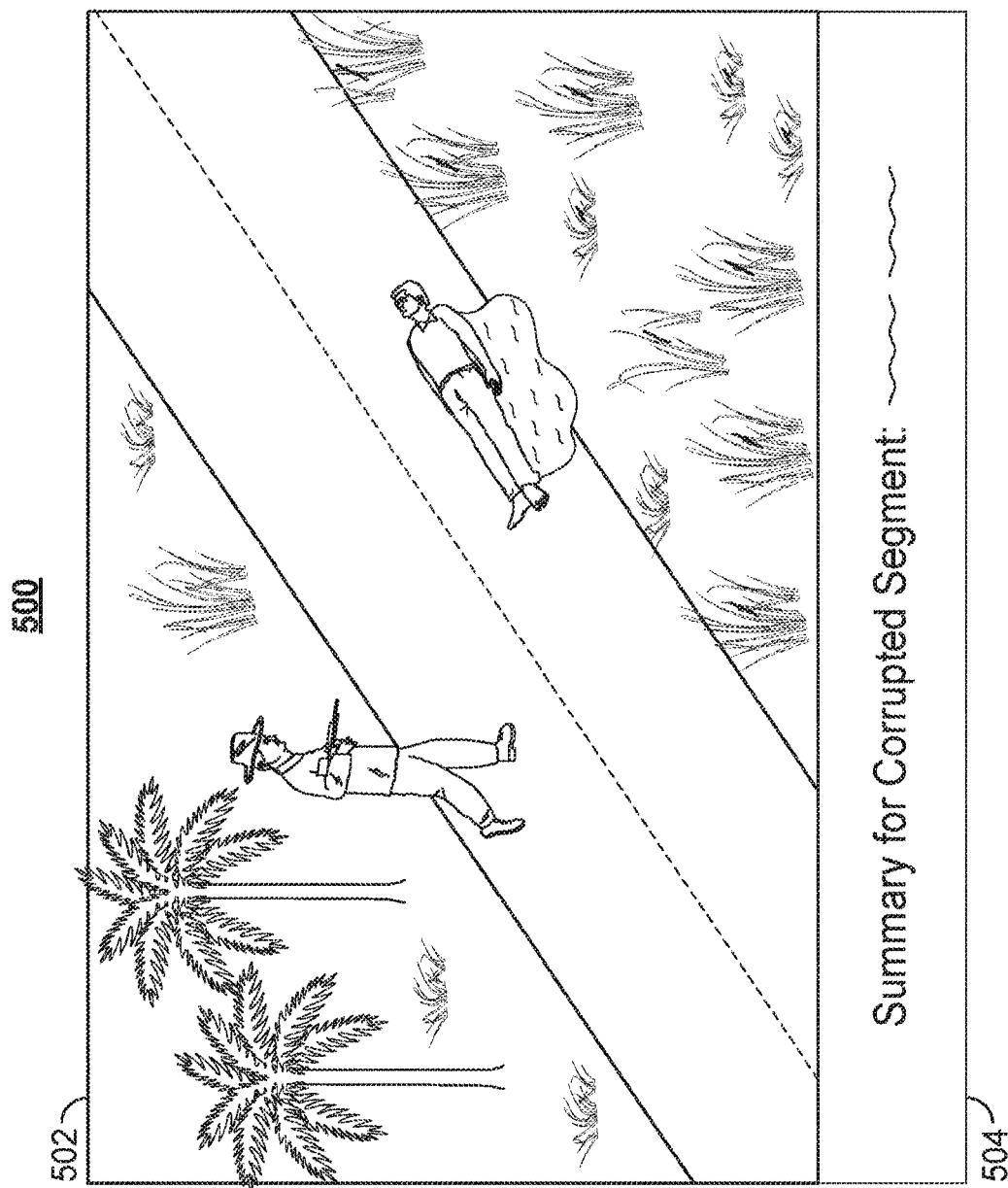
FIG. 5 shows yet another illustrative example of a display screen generated by a media guidance application in accordance with some embodiments of the disclosure.

If the importance level is less than or equal to the threshold level, the interactive media guidance application may generate for display the subsequent segment of the media asset. The interactive media guidance application, at a substantially same time as generating for display the subsequent segment, may generate for display the summary for the corrupted segment in an overlay on the subsequent segment of the media asset. In FIG. 5, the interactive media guidance application generates for display the subsequent segment 502 and overlays the subsequent segment 502 with the summary of the corrupted segment 504.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 6:
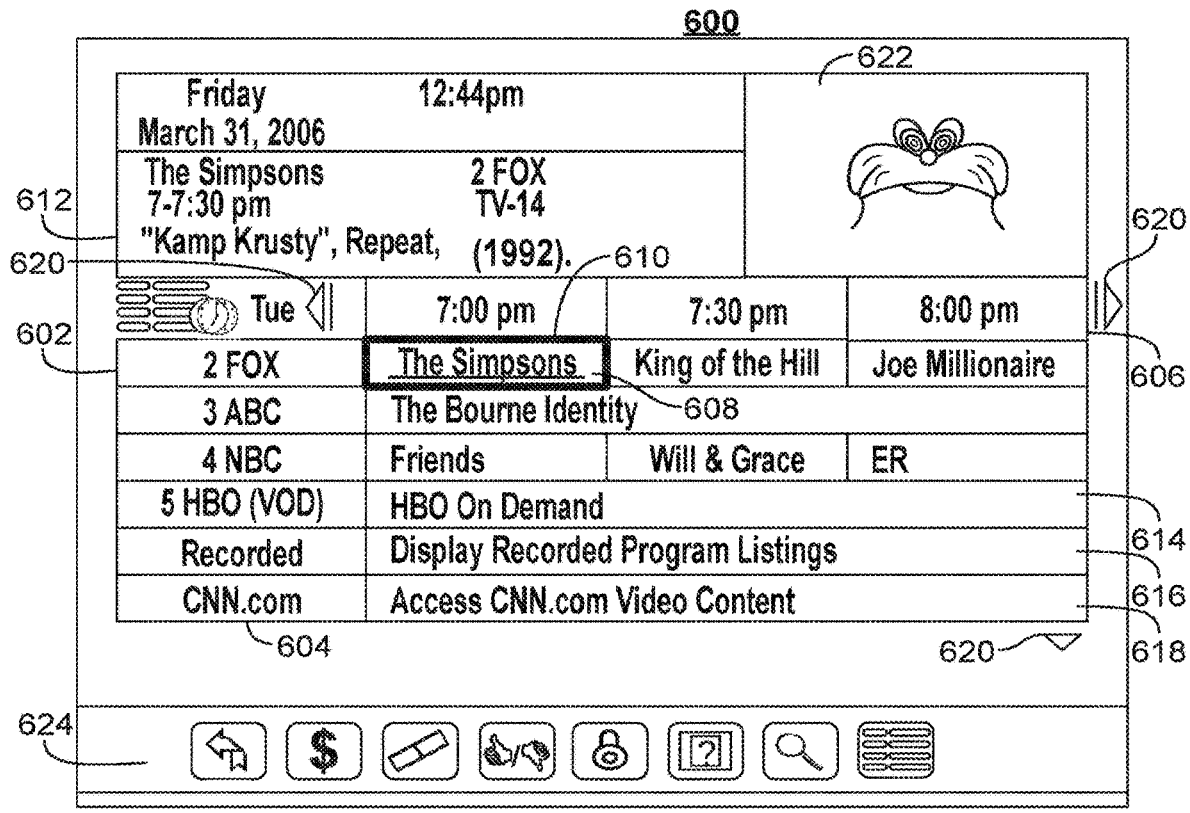
FIG. 6 shows yet another illustrative example of a display screen generated by a media guidance application in accordance with some embodiments of the disclosure.
Figure 7:
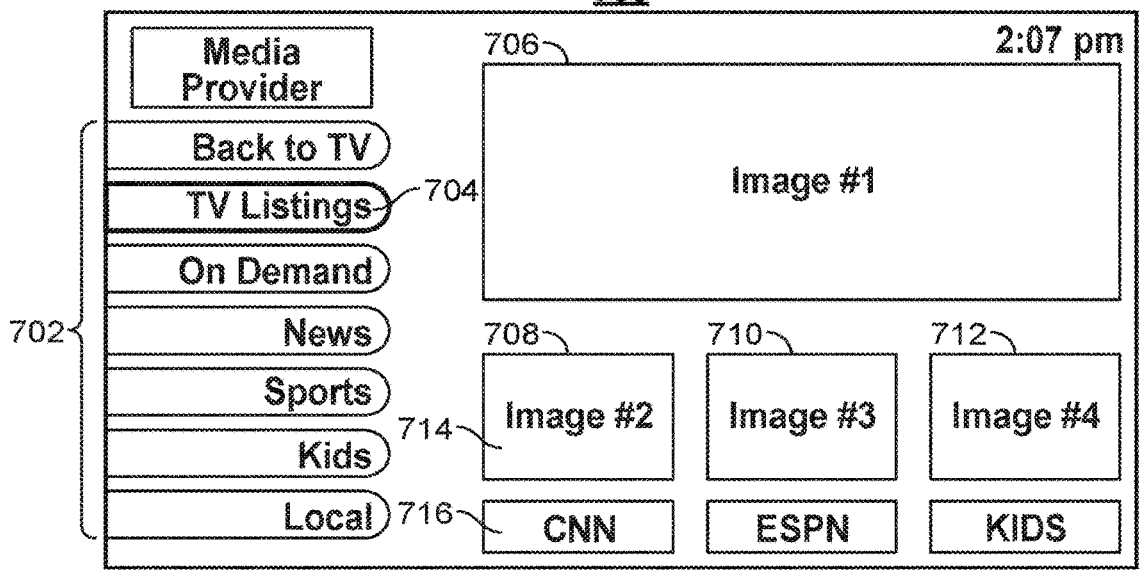
FIG. 7 shows yet another illustrative example of a display screen generated by a media guidance application in accordance with some embodiments of the disclosure.

FIGS. 6-7 show illustrative display screens that may be used to provide media guidance data. The display screens shown in FIGS. 6-7 may be implemented on any suitable user equipment device or platform. While the displays of FIGS. 6-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 6 shows illustrative grid of a program listings display 600 arranged by time and channel that also enables access to different types of content in a single display. Display 600 may include grid 602 with: (1) a column of channel/content type identifiers 604, where each channel/content type identifier (which is a cell in the column) identifies a different channel or content type available; and (2) a row of time identifiers 606, where each time identifier (which is a cell in the row) identifies a time block of programming. Grid 602 also includes cells of program listings, such as program listing 608, where each listing provides the title of the program provided on the listing's associated channel and time. With a user input device, a user can select program listings by moving highlight region 610. Information relating to the program listing selected by highlight region 610 may be provided in program information region 612. Region 612 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 602 may provide media guidance data for non-linear programming including on-demand listing 614, recorded content listing 616, and Internet content listing 618. A display combining media guidance data for content from different types of content sources is sometimes referred to as a "mixed-media" display. Various permutations of the types of media guidance data that may be displayed that are different than display 600 may be based on user selection or guidance application definition (e.g., a display of only recorded and broadcast listings, only on-demand and broadcast listings, etc.). As illustrated, listings 614, 616, and 618 are shown as spanning the entire time block displayed in grid 602 to indicate that selection of these listings may provide access to a display dedicated to on-demand listings, recorded listings, or Internet listings, respectively. In some embodiments, listings for these content types may be included directly in grid 602. Additional media guidance data may be displayed in response to the user selecting one of the navigational icons 620. (Pressing an arrow key on a user input device may affect the display in a similar manner as selecting navigational icons 620.)

Display 600 may also include video region 622, and options region 626. Video region 622 may allow the user to view and/or preview programs that are currently available, will be available, or were available to the user. The content of video region 622 may correspond to, or be independent from, one of the listings displayed in grid 602. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 626 may allow the user to access different types of content, media guidance application displays, and/or media guidance application features. Options region 626 may be part of display 600 (and other display screens described herein), or may be invoked by a user by selecting an on-screen option or pressing a dedicated or assignable button on a user input device. The selectable options within options region 626 may concern features related to program listings in grid 602 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 9. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 7. Video mosaic display 700 includes selectable options 702 for content information organized based on content type, genre, and/or other organization criteria. In display 700, television listings option 704 is selected, thus providing listings 706, 708, 710, and 712 as broadcast program listings. In display 700 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 708 may include more than one portion, including media portion 714 and text portion 716. Media portion 714 and/or text portion 716 may be selectable to view content in full-screen or to view information related to the content displayed in media portion 714 (e.g., to view listings for the channel that the video is displayed on).

The listings in display 700 are of different sizes (i.e., listing 706 is larger than listings 708, 710, and 712), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 8:
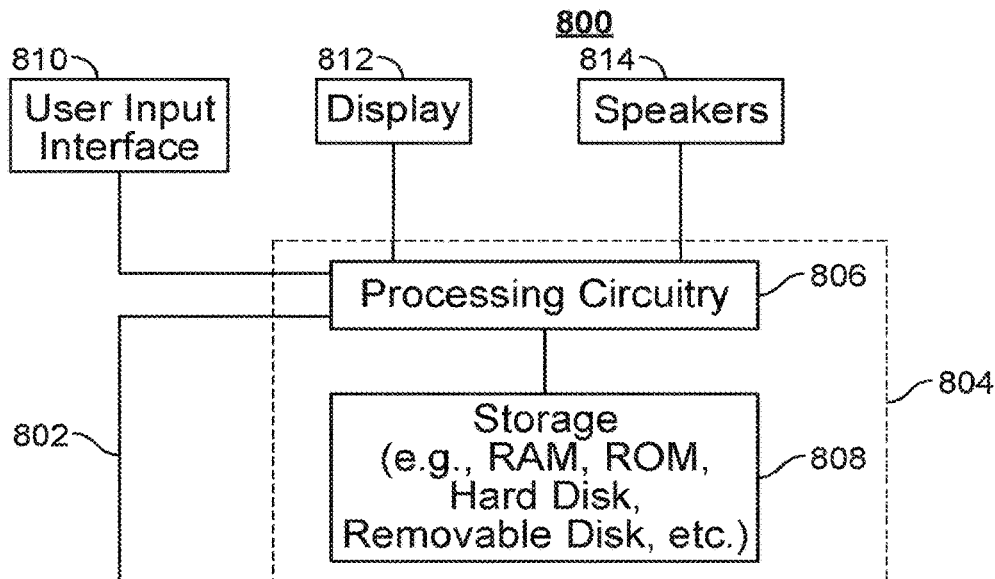
FIG. 8 is a block diagram of an illustrative user equipment device in accordance with some embodiments of the disclosure.

Users may access content and the media guidance application (and its display screens described above and below) from one or more of their user equipment devices. FIG. 8 shows a generalized embodiment of illustrative user equipment device 800. More specific implementations of user equipment devices are discussed below in connection with FIG. 9. User equipment device 800 may receive content and data via input/output (hereinafter "I/O") path 802. I/O path 802 may provide content (e.g., broadcast programming, on-demand programming, Internet content, content available over a local area network (LAN) or wide area network (WAN), and/or other content) and data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media guidance application stored in memory (i.e., storage 808). Specifically, control circuitry 804 may be instructed by the media guidance application to perform the functions discussed above and below. For example, the media guidance application may provide instructions to control circuitry 804 to generate the media guidance displays. In some implementations, any action performed by control circuitry 804 may be based on instructions received from the media guidance application.

In client-server based embodiments, control circuitry 804 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media guidance data described above. Nonvolatile memory may also be used (e.g., to launch a boot-up routine and other instructions). Cloud-based storage, described in relation to FIG. 9, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of the user equipment 800. Circuitry 804 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment 800, the tuning and encoding circuitry (including multiple tuners) may be associated with storage 808.

A user may send instructions to control circuitry 804 using user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of user equipment device 800. For example, display 812 may be a touchscreen or touch-sensitive display. In such circumstances, user input interface 810 may be integrated with or combined with display 812. Display 812 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 812 may be HDTV-capable. In some embodiments, display 812 may be a 3D display, and the interactive media guidance application and any suitable content may be displayed in 3D. A video card or graphics card may generate the output to the display 812. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 804. The video card may be integrated with the control circuitry 804. Speakers 814 may be provided as integrated with other elements of user equipment device 800 or may be stand-alone units. The audio component of videos and other content displayed on display 812 may be played through speakers 814. In some embodiments, the audio may be distributed to a receiver (not shown), which processes and outputs the audio via speakers 814.

The guidance application may be implemented using any suitable architecture. For example, it may be a stand-alone application wholly-implemented on user equipment device 800. In such an approach, instructions of the application are stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to generate any of the displays discussed herein. Based on the processed instructions, control circuitry 804 may determine what action to perform when input is received from input interface 810. For example, movement of a cursor on a display up/down may be indicated by the processed instructions when input interface 810 indicates that an up/down button was selected.

In some embodiments, the media guidance application is a client-server based application. Data for use by a thick or thin client implemented on user equipment device 800 is retrieved on-demand by issuing requests to a server remote to the user equipment device 800. In one example of a client-server based guidance application, control circuitry 804 runs a web browser that interprets web pages provided by a remote server. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on equipment device 800. This way, the processing of the instructions is performed remotely by the server while the resulting displays are provided locally on equipment device 800. Equipment device 800 may receive inputs from the user via input interface 810 and transmit those inputs to the remote server for processing and generating the corresponding displays. For example, equipment device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to equipment device 800 for presentation to the user.

In some embodiments, the media guidance application is downloaded and interpreted or otherwise run by an interpreter or virtual machine (run by control circuitry 804). In some embodiments, the guidance application may be encoded in the ETV Binary Interchange Format (EBIF), received by control circuitry 804 as part of a suitable feed, and interpreted by a user agent running on control circuitry 804. For example, the guidance application may be an EBIF application. In some embodiments, the guidance application may be defined by a series of JAVA-based files that are received and run by a local virtual machine or other suitable middleware executed by control circuitry 804. In some of such embodiments (e.g., those employing MPEG-2 or other digital media encoding schemes), the guidance application may be, for example, encoded and transmitted in an MPEG-2 object carousel with the MPEG audio and video packets of a program.

Figure 9:
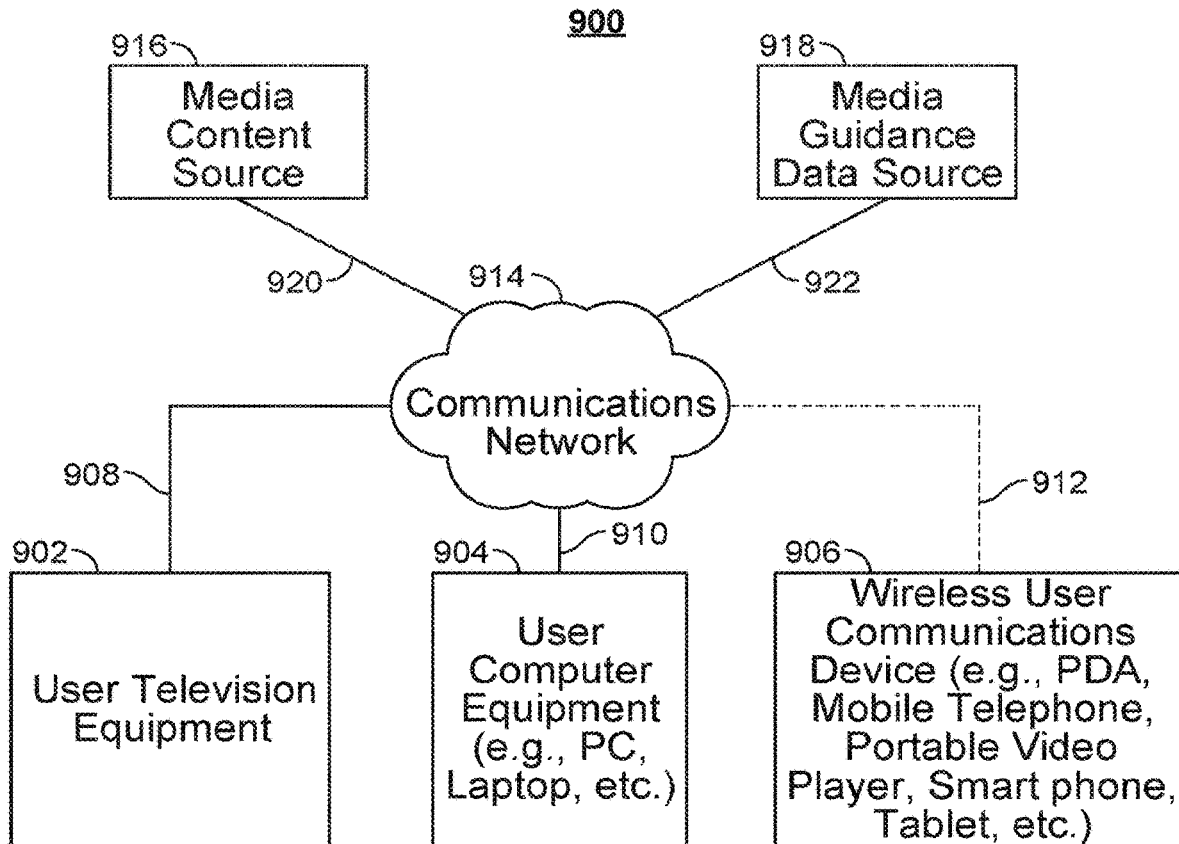
FIG. 9 is a block diagram of an illustrative media system in accordance with some embodiments of the disclosure.

User equipment device 800 of FIG. 8 can be implemented in system 900 of FIG. 9 as user television equipment 902, user computer equipment 904, wireless user communications device 906, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 8 may not be classified solely as user television equipment 902, user computer equipment 904, or a wireless user communications device 906. For example, user television equipment 902 may, like some user computer equipment 904, be Internet-enabled allowing for access to Internet content, while user computer equipment 904 may, like some television equipment 902, include a tuner allowing for access to television programming. The media guidance application may have the same layout on various different types of user equipment or may be tailored to the display capabilities of the user equipment. For example, on user computer equipment 904, the guidance application may be provided as a web site accessed by a web browser. In another example, the guidance application may be scaled down for wireless user communications devices 906.

In system 900, there is typically more than one of each type of user equipment device but only one of each is shown in FIG. 9 to avoid overcomplicating the drawing. In addition, each user may utilize more than one type of user equipment device and also more than one of each type of user equipment device.

In some embodiments, a user equipment device (e.g., user television equipment 902, user computer equipment 904, wireless user communications device 906) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 914. Namely, user television equipment 902, user computer equipment 904, and wireless user communications device 906 are coupled to communications network 914 via communications paths 908, 910, and 912, respectively. Communications network 914 may be one or more networks including the Internet, a mobile phone network, mobile voice or data network (e.g., a 4G or LTE network), cable network, public switched telephone network, or other types of communications network or combinations of communications networks. Paths 908, 910, and 912 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 912 is drawn with dotted lines to indicate that in the exemplary embodiment shown in FIG. 9 it is a wireless path and paths 908 and 910 are drawn as solid lines to indicate they are wired paths (although these paths may be wireless paths, if desired). Communications with the user equipment devices may be provided by one or more of these communications paths, but are shown as a single path in FIG. 9 to avoid overcomplicating the drawing.

Although communications paths are not drawn between user equipment devices, these devices may communicate directly with each other via communication paths, such as those described above in connection with paths 908, 910, and 912, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 914.

System 900 includes content source 916 and media guidance data source 918 coupled to communications network 914 via communication paths 920 and 922, respectively. Paths 920 and 922 may include any of the communication paths described above in connection with paths 908, 910, and 912. Communications with the content source 916 and media guidance data source 918 may be exchanged over one or more communications paths, but are shown as a single path in FIG. 9 to avoid overcomplicating the drawing. In addition, there may be more than one of each of content source 916 and media guidance data source 918, but only one of each is shown in FIG. 9 to avoid overcomplicating the drawing. (The different types of each of these sources are discussed below.) If desired, content source 916 and media guidance data source 918 may be integrated as one source device. Although communications between sources 916 and 918 with user equipment devices 902, 904, and 906 are shown as through communications network 914, in some embodiments, sources 916 and 918 may communicate directly with user equipment devices 902, 904, and 906 via communication paths (not shown) such as those described above in connection with paths 908, 910, and 912.

Content source 916 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 916 may be the originator of content (e.g., a television broadcaster, a Webcast provider, etc.) or may not be the originator of content (e.g., an on-demand content provider, an Internet provider of content of broadcast programs for downloading, etc.). Content source 916 may include cable sources, satellite providers, on-demand providers, Internet providers, over-the-top content providers, or other providers of content. Content source 916 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 918 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 918 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 918 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 918 may provide user equipment devices 902, 904, and 906 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 808, and executed by control circuitry 804 of a user equipment device 800. In some embodiments, media guidance applications may be client-server applications where only a client application resides on the user equipment device, and server application resides on a remote server. For example, media guidance applications may be implemented partially as a client application on control circuitry 804 of user equipment device 800 and partially on a remote server as a server application (e.g., media guidance data source 918) running on control circuitry of the remote server. When executed by control circuitry of the remote server (such as media guidance data source 918), the media guidance application may instruct the control circuitry to generate the guidance application displays and transmit the generated displays to the user equipment devices. The server application may instruct the control circuitry of the media guidance data source 918 to transmit data for storage on the user equipment. The client application may instruct control circuitry of the receiving user equipment to generate the guidance application displays.

Content and/or media guidance data delivered to user equipment devices 902, 904, and 906 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 900 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 9.

In one approach, user equipment devices may communicate with each other within a home network. User equipment devices can communicate with each other directly via short-range point-to-point communication schemes described above, via indirect paths through a hub or other similar device provided on a home network, or via communications network 914. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 916 to access content. Specifically, within a home, users of user television equipment 902 and user computer equipment 904 may access the media guidance application to navigate among and locate desirable content. Users may also access the media guidance application outside of the home using wireless user communications devices 906 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 914. These cloud resources may include one or more content sources 916 and one or more media guidance data sources 918. In addition or in the alternative, the remote computing sites may include other user equipment devices, such as user television equipment 902, user computer equipment 904, and wireless user communications device 906. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 904 or wireless user communications device 906 having content capture feature. Alternatively, the user can first transfer the content to a user equipment device, such as user computer equipment 904. The user equipment device storing the content uploads the content to the cloud using a data transmission service on communications network 914. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 8.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 10:
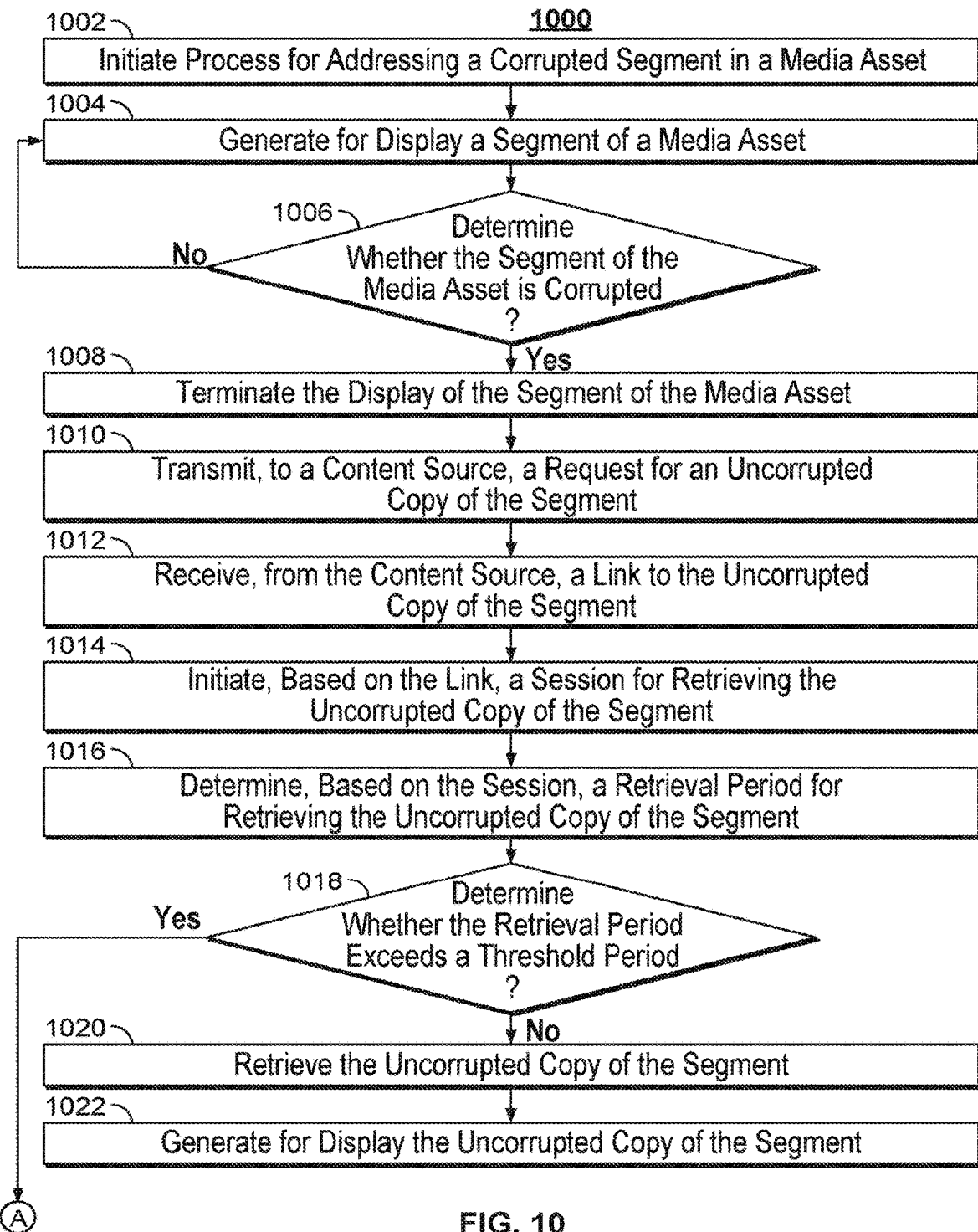
FIG. 10 is a flowchart of an illustrative process for addressing a corrupted segment in a media asset in accordance with some embodiments of the disclosure.
Figure 10:
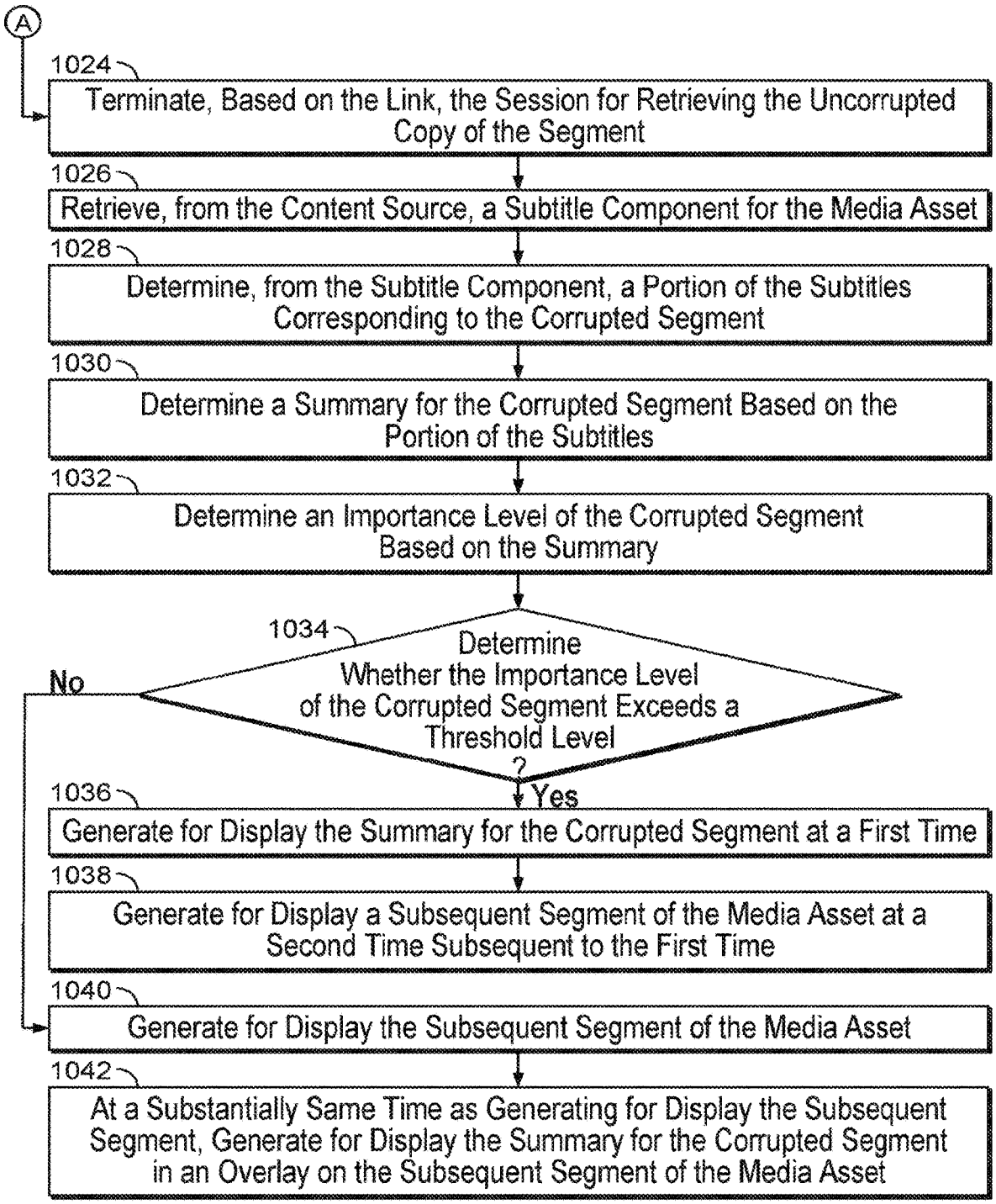

FIG. 10 is a flowchart of illustrative process 1000 for an interactive media guidance application implemented on control circuitry (e.g., control circuitry 804, FIG. 8) of a user device (e.g., user equipment device 800, FIG. 8) to execute a process for addressing a corrupted segment in a media asset. In some embodiments, these algorithms may be encoded onto a non-transitory storage medium (e.g., storage device 808) as a set of instructions to be decoded and executed by processing circuitry (e.g., processing circuitry 806). Processing circuitry may in turn provide instructions to other sub-circuits contained within control circuitry 804, such as the tuning, video generating, encoding, decoding, encrypting, decrypting, scaling, analog/digital conversion circuitry, and the like.

At step 1002, the interactive media guidance application implemented on control circuitry (e.g., control circuitry 804, FIG. 8) initiates the process for addressing a corrupted segment in a media asset. In some embodiments, this may be done either directly or indirectly in response to a user action or input (e.g., from signals received by control circuitry 804 or user input interface 810). For example, the process may begin directly in response to control circuitry 804 receiving signals from user input interface 810, or control circuitry 804 may prompt the user to confirm their input using a display (e.g., by generating a prompt to be displayed on display 812) prior to running the algorithm.

At step 1004, the interactive media guidance application implemented on control circuitry (e.g., control circuitry 804, FIG. 8) generates for display a segment of a media asset.

At step 1006, the interactive media guidance application implemented on control circuitry (e.g., control circuitry 804, FIG. 8) determines whether the segment of the media asset is corrupted. Based on determining that the segment is not corrupted, the interactive media guidance application implemented on control circuitry (e.g., control circuitry 804, FIG. 8) returns to step 1004. Based on determining that the segment is corrupted, the interactive media guidance application implemented on control circuitry (e.g., control circuitry 804, FIG. 8) proceeds to step 1008.

In some embodiments, the interactive media guidance application implemented on control circuitry (e.g., control circuitry 804, FIG. 8) determines whether the segment of the media asset is corrupted by performing the following steps. The interactive media guidance application implemented on control circuitry (e.g., control circuitry 804, FIG. 8) receives, from the content source, a prior segment preceding the segment of the media asset. The interactive media guidance application implemented on control circuitry (e.g., control circuitry 804, FIG. 8) extracts a last frame from the prior segment. The interactive media guidance application implemented on control circuitry (e.g., control circuitry 804, FIG. 8) extracts an initial frame from the segment of the media asset. The interactive media guidance application implemented on control circuitry (e.g., control circuitry 804, FIG. 8) determines a deviation between the last frame of the prior segment and the initial frame of the segment of the media asset. The interactive media guidance application implemented on control circuitry (e.g., control circuitry 804, FIG. 8) determines whether the deviation exceeds a threshold deviation. Based on determining that the deviation exceeds the threshold deviation, the interactive media guidance application implemented on control circuitry (e.g., control circuitry 804, FIG. 8) determines that the segment of the media asset is corrupted. Based on determining that the deviation does not exceed the threshold deviation, the interactive media guidance application implemented on control circuitry (e.g., control circuitry 804, FIG. 8) determines that the segment of the media asset is not corrupted.

At step 1008, the interactive media guidance application implemented on control circuitry (e.g., control circuitry 804, FIG. 8) terminates the display of the segment of the media asset.

At step 1010, the interactive media guidance application implemented on control circuitry (e.g., control circuitry 804, FIG. 8) transmits, to a content source, a request for an uncorrupted copy of the segment.

At step 1012, the interactive media guidance application implemented on control circuitry (e.g., control circuitry 804, FIG. 8) receives, from the content source, a link to the uncorrupted copy of the segment.

At step 1014, the interactive media guidance application implemented on control circuitry (e.g., control circuitry 804, FIG. 8) initiates, based on the link, a session for retrieving the uncorrupted copy of the segment.

At step 1016, the interactive media guidance application implemented on control circuitry (e.g., control circuitry 804, FIG. 8) determines, based on the session, a retrieval period for retrieving the uncorrupted copy of the segment.

In some embodiments, the interactive media guidance application implemented on control circuitry (e.g., control circuitry 804, FIG. 8) determines, based on the session, the retrieval period for retrieving the uncorrupted copy of the segment by performing the following steps. The interactive media guidance application implemented on control circuitry (e.g., control circuitry 804, FIG. 8) retrieves a portion of the uncorrupted copy of the segment. The interactive media guidance application implemented on control circuitry (e.g., control circuitry 804, FIG. 8) tracks a partial period taken to retrieve the portion. The interactive media guidance application implemented on control circuitry (e.g., control circuitry 804, FIG. 8) determines a retrieval rate based on the partial period taken to retrieve the portion. The interactive media guidance application implemented on control circuitry (e.g., control circuitry 804, FIG. 8) determines the retrieval period as an estimation for retrieving a remaining portion of the uncorrupted copy of the segment according to the retrieval rate.

At step 1018, the interactive media guidance application implemented on control circuitry (e.g., control circuitry 804, FIG. 8) determines whether the retrieval period exceeds a threshold period. Based on determining that the retrieval period does not exceed the threshold period, the interactive media guidance application implemented on control circuitry (e.g., control circuitry 804, FIG. 8) proceeds to step 1020. Based on determining that the retrieval period exceeds the threshold period, the interactive media guidance application implemented on control circuitry (e.g., control circuitry 804, FIG. 8) proceeds to step 1024.

At step 1020, the interactive media guidance application implemented on control circuitry (e.g., control circuitry 804, FIG. 8) retrieves the uncorrupted copy of the segment.

At step 1022, the interactive media guidance application implemented on control circuitry (e.g., control circuitry 804, FIG. 8) generates for display the uncorrupted copy of the segment.

At step 1024, the interactive media guidance application implemented on control circuitry (e.g., control circuitry 804, FIG. 8) terminates, based on the link, the session for retrieving the uncorrupted copy of the segment.

At step 1026, the interactive media guidance application implemented on control circuitry (e.g., control circuitry 804, FIG. 8) retrieves, from the content source, a subtitle component for the media asset.

At step 1028, the interactive media guidance application implemented on control circuitry (e.g., control circuitry 804, FIG. 8) determines, from the subtitle component, a portion of the subtitles corresponding to the corrupted segment.

In some embodiments, the interactive media guidance application implemented on control circuitry (e.g., control circuitry 804, FIG. 8) determines, from the subtitle component, the portion of the subtitles corresponding to the corrupted segment by determining a starting time index and an ending time index for the corrupted segment and determining, from the subtitle component, the portion of the subtitles between the starting time index and the ending time index.

At step 1030, the interactive media guidance application implemented on control circuitry (e.g., control circuitry 804, FIG. 8) determines a summary for the corrupted segment based on the portion of the subtitles.

In some embodiments, the interactive media guidance application implemented on control circuitry (e.g., control circuitry 804, FIG. 8) determines the summary for the corrupted segment based on the portion of the subtitles by determining one or more central characters in the portion of the subtitles, extracting text from the portion relating to the one or more central characters, and merging the extracted text into the summary for the corrupted segment.

At step 1032, the interactive media guidance application implemented on control circuitry (e.g., control circuitry 804, FIG. 8) determines an importance level of the corrupted segment based on the summary.

In some embodiments, the interactive media guidance application implemented on control circuitry (e.g., control circuitry 804, FIG. 8) determines the importance level of the corrupted segment based on the summary by determining a length of the summary and assigning the importance level based on the length of the summary.

In some embodiments, the interactive media guidance application implemented on control circuitry (e.g., control circuitry 804, FIG. 8) determines the importance level of the corrupted segment based on the summary by determining a number of central characters in the summary and assigning the importance level based on the number of central characters.

At step 1034, the interactive media guidance application implemented on control circuitry (e.g., control circuitry 804, FIG. 8) determines whether the importance level of the corrupted segment exceeds a threshold level. Based on determining that the importance level of the corrupted segment exceeds the threshold level, the interactive media guidance application implemented on control circuitry (e.g., control circuitry 804, FIG. 8) proceeds to step 1036. Based on determining that the importance level of the corrupted segment does not exceed the threshold level, the interactive media guidance application implemented on control circuitry (e.g., control circuitry 804, FIG. 8) proceeds to step 1040.

At step 1036, the interactive media guidance application implemented on control circuitry (e.g., control circuitry 804, FIG. 8) generates for display the summary for the corrupted segment at a first time.

In some embodiments, the interactive media guidance application implemented on control circuitry (e.g., control circuitry 804, FIG. 8) generates for display the summary for the corrupted segment at the first time by generating for display a textual version of the summary accompanied with a text-to-speech narration of the summary.

In some embodiments, the interactive media guidance application implemented on control circuitry (e.g., control circuitry 804, FIG. 8) generates for display the summary for the corrupted segment at the first time by generating for display a textual version of the summary for a fixed period of time.

At step 1038, the interactive media guidance application implemented on control circuitry (e.g., control circuitry 804, FIG. 8) generates for display a subsequent segment of the media asset at a second time subsequent to the first time.

In some embodiments, the interactive media guidance application implemented on control circuitry (e.g., control circuitry 804, FIG. 8) generates for display a subsequent segment of the media asset at the second time subsequent to the first time by generating for display the subsequent segment of the media asset at the second time when at least one of a text-to-speech narration of the summary is complete and a textual version of the summary has been displayed for a fixed period of time.

At step 1040, the interactive media guidance application implemented on control circuitry (e.g., control circuitry 804, FIG. 8) generates for display the subsequent segment of the media asset.

At step 1042, the interactive media guidance application implemented on control circuitry (e.g., control circuitry 804, FIG. 8), at a substantially same time as generating for display the subsequent segment, generates for display the summary for the corrupted segment in an overlay on the subsequent segment of the media asset.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 8-9 could be used to implement one or more portions of the process.

Figure 11:
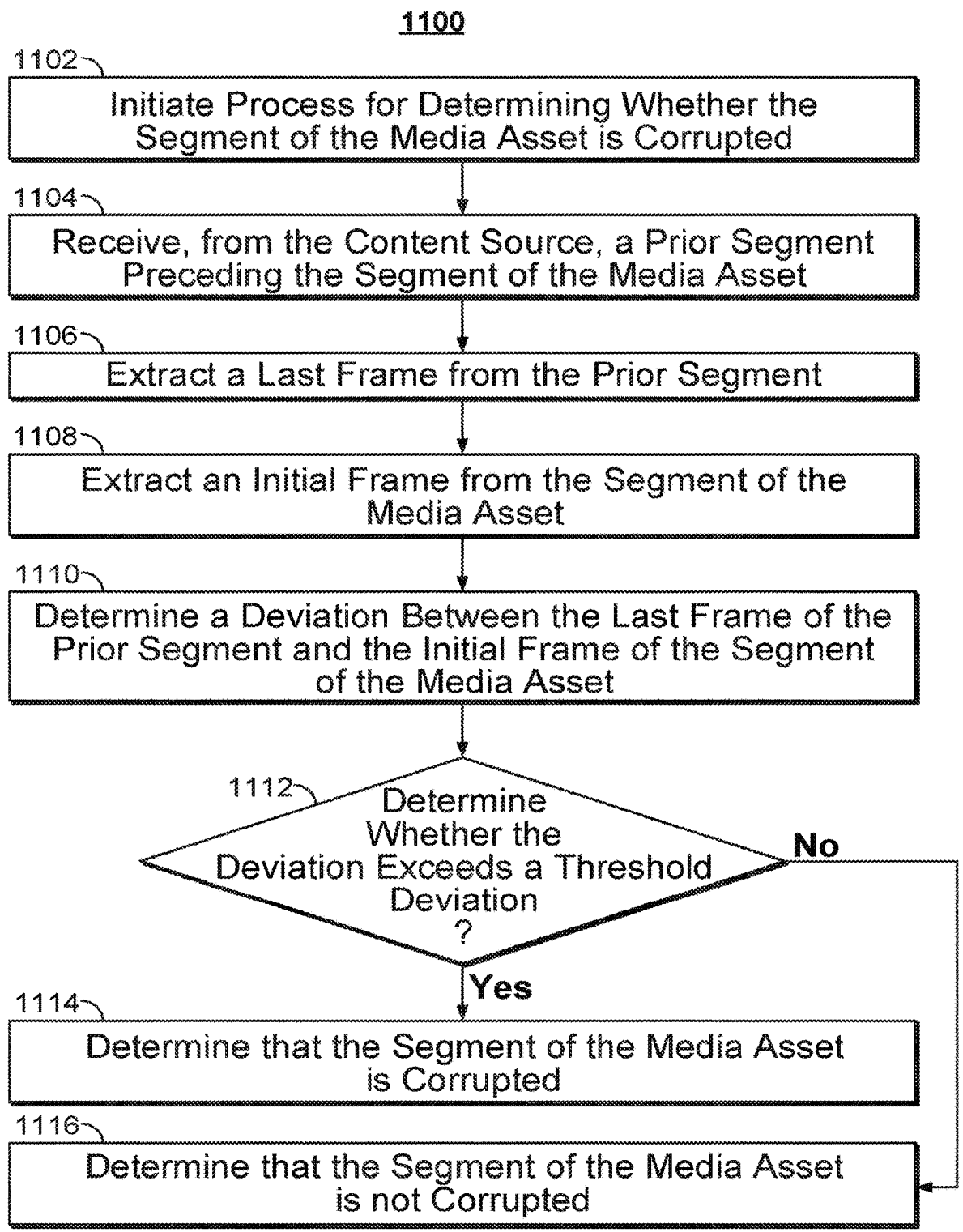
FIG. 11 is a flowchart of an illustrative process for determining whether the segment of the media asset is corrupted in accordance with some embodiments of the disclosure.

FIG. 11 is a flowchart of illustrative process 1100 for an interactive media guidance application implemented on control circuitry (e.g., control circuitry 804, FIG. 8) of a user device (e.g., user equipment device 800, FIG. 8) to execute a process for determining whether the segment of the media asset is corrupted. This is an illustrative process for executing step 1006 of FIG. 10. In some embodiments, these algorithms may be encoded onto a non-transitory storage medium (e.g., storage device 808) as a set of instructions to be decoded and executed by processing circuitry (e.g., processing circuitry 806). Processing circuitry may in turn provide instructions to other sub-circuits contained within control circuitry 804, such as the tuning, video generating, encoding, decoding, encrypting, decrypting, scaling, analog/digital conversion circuitry, and the like.

At step 1102, the interactive media guidance application implemented on control circuitry (e.g., control circuitry 804, FIG. 8) initiates the process for determining whether the segment of the media asset is corrupted. In some embodiments, this may be done either directly or indirectly in response to a user action or input (e.g., from signals received by control circuitry 804 or user input interface 810). For example, the process may begin directly in response to control circuitry 804 receiving signals from user input interface 810, or control circuitry 804 may prompt the user to confirm their input using a display (e.g., by generating a prompt to be displayed on display 812) prior to running the algorithm.

At step 1104, the interactive media guidance application implemented on control circuitry (e.g., control circuitry 804, FIG. 8) receives, from the content source, a prior segment preceding the segment of the media asset.

At step 1106, the interactive media guidance application implemented on control circuitry (e.g., control circuitry 804, FIG. 8) extracts a last frame from the prior segment.

At step 1108, the interactive media guidance application implemented on control circuitry (e.g., control circuitry 804, FIG. 8) extracts an initial frame from the segment of the media asset.

At step 1110, the interactive media guidance application implemented on control circuitry (e.g., control circuitry 804, FIG. 8) determines a deviation between the last frame of the prior segment and the initial frame of the segment of the media asset.

At step 1112, the interactive media guidance application implemented on control circuitry (e.g., control circuitry 804, FIG. 8) determines whether the deviation exceeds a threshold deviation. Based on determining that the deviation exceeds the threshold deviation, the interactive media guidance application implemented on control circuitry (e.g., control circuitry 804, FIG. 8) proceeds to step 1114. Based on determining that the deviation does not exceed the threshold deviation, the interactive media guidance application implemented on control circuitry (e.g., control circuitry 804, FIG. 8) proceeds to step 1116.

At step 1114, the interactive media guidance application implemented on control circuitry (e.g., control circuitry 804, FIG. 8) determines that the segment of the media asset is corrupted.

At step 1116, the interactive media guidance application implemented on control circuitry (e.g., control circuitry 804, FIG. 8) determines that the segment of the media asset is not corrupted.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 8-9 could be used to implement one or more portions of the process.

Figure 12:
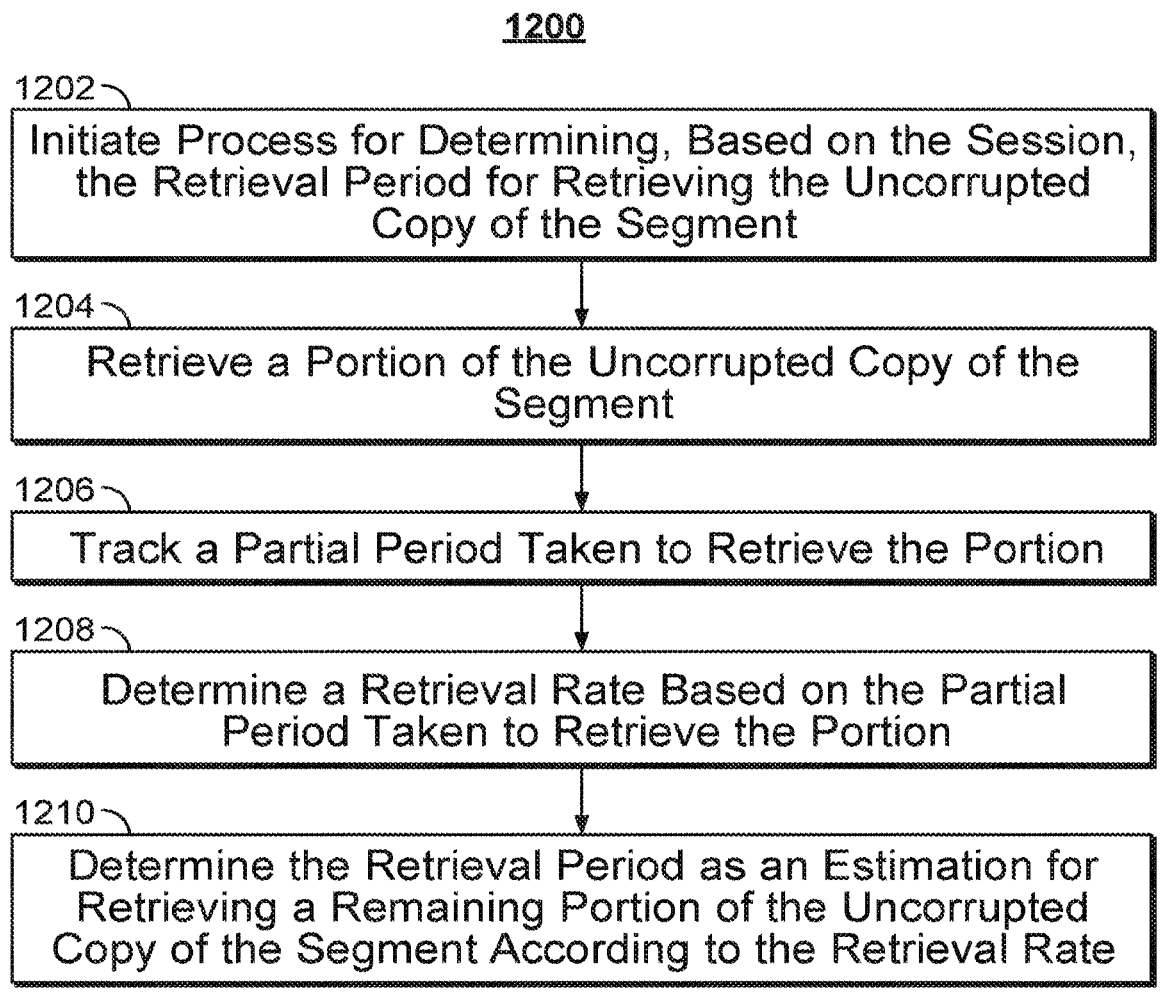
FIG. 12 is a flowchart of an illustrative process for determining the retrieval period for retrieving the uncorrupted copy of the segment in accordance with some embodiments of the disclosure.

FIG. 12 is a flowchart of illustrative process 1200 for an interactive media guidance application implemented on control circuitry (e.g., control circuitry 804, FIG. 8) of a user device (e.g., user equipment device 800, FIG. 8) to execute a process for determining the retrieval period for retrieving the uncorrupted copy of the segment. This is an illustrative process for executing step 1016 of FIG. 10. In some embodiments, these algorithms may be encoded onto a non-transitory storage medium (e.g., storage device 808) as a set of instructions to be decoded and executed by processing circuitry (e.g., processing circuitry 806). Processing circuitry may in turn provide instructions to other sub-circuits contained within control circuitry 804, such as the tuning, video generating, encoding, decoding, encrypting, decrypting, scaling, analog/digital conversion circuitry, and the like.

At step 1202, the interactive media guidance application implemented on control circuitry (e.g., control circuitry 804, FIG. 8) initiates the process for determining, based on the session, a retrieval period for retrieving the uncorrupted copy of the segment. In some embodiments, this may be done either directly or indirectly in response to a user action or input (e.g., from signals received by control circuitry 804 or user input interface 810). For example, the process may begin directly in response to control circuitry 804 receiving signals from user input interface 810, or control circuitry 804 may prompt the user to confirm their input using a display (e.g., by generating a prompt to be displayed on display 812) prior to running the algorithm.

At step 1204, the interactive media guidance application implemented on control circuitry (e.g., control circuitry 804, FIG. 8) retrieves a portion of the uncorrupted copy of the segment.

At step 1206, the interactive media guidance application implemented on control circuitry (e.g., control circuitry 804, FIG. 8) tracks a partial period taken to retrieve the portion.

At step 1208, the interactive media guidance application implemented on control circuitry (e.g., control circuitry 804, FIG. 8) determines a retrieval rate based on the partial period taken to retrieve the portion.

At step 1210, the interactive media guidance application implemented on control circuitry (e.g., control circuitry 804, FIG. 8) determines the retrieval period as an estimation for retrieving a remaining portion of the uncorrupted copy of the segment according to the retrieval rate.

It is contemplated that the steps or descriptions of FIG. 12 may be used with any other embodiment of this disclosure. In addition, the descriptions described in relation to the algorithm of FIG. 12 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIG. 12 may be implemented on a combination of appropriately configured software and hardware, and that any of the devices or equipment discussed in relation to FIGS. 8-9 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   receiving, from a content source, a first segment of a media asset;
   determining a start time of the first segment within the media asset;
   within a period of time between a current playback time of the media asset and the start time:

extracting a last frame from a second segment of the media asset that immediately precedes the first segment;

extracting an initial frame from the first segment;

comparing the last frame of the second segment to the initial frame of the first segment to determine a deviation between the last frame of the second segment to the initial frame of the first segment;

in response to determining that the deviation exceeds a threshold deviation, determining that the first segment of the media asset is a corrupted segment; and in response to determining that the first segment is the corrupted segment, performing an action for addressing the corrupted segment of the media asset.

2. The method of claim 1, wherein the performing the action for addressing the corrupted segment comprises performing one of: generating for display an uncorrupted copy of the corrupted segment or generating for display a summary of the corrupted segment in an overlay.

3. The method of claim 1, further comprising:

determining whether a retrieval period to retrieve an uncorrupted portion of the media asset exceeds a threshold period;

based on determining that the retrieval period does not exceed the threshold period, retrieving and generating for display the uncorrupted portion of the media asset; and based on determining that the retrieval period exceeds the threshold period, generating for display a summary of the uncorrupted portion of the media asset.

4. The method of claim 3, wherein determining the retrieval period further comprises:

retrieving the uncorrupted portion of the first segment;

tracking a partial period taken to retrieve the uncorrupted portion;

determining a retrieval rate based on the partial period taken to retrieve the uncorrupted portion; and determining the retrieval period as an estimation for retrieving a remaining uncorrupted portion of the first segment according to the retrieval rate.

5. The method of claim 1, further comprising:

determining a summary for the corrupted segment based on a portion of retrieved subtitles;

determining an importance level of the corrupted segment based on the summary;

determining whether the importance level of the corrupted segment exceeds a threshold level; and based on determining that the importance level of the corrupted segment exceeds the threshold level:

generating for display the summary for the corrupted segment at a first time; and generating for display an uncorrupted segment of the media asset at a second time subsequent to the first time.

6. The method of claim 5, further comprising:

based on determining that the importance level of the corrupted segment does not exceed the threshold level:

generating for display the second segment of the media asset; and at a substantially same time as generating for display the second segment, generating for display the summary for the corrupted segment in an overlay on the second segment of the media asset.

7. The method of claim 5, further comprising:

determining a starting time index and an ending time index for the corrupted segment; and determining, from a subtitle component, the portion of the retrieved subtitles between the starting time index and the ending time index.

8. The method of claim 5, wherein the importance level of the corrupted segment of the media asset is determined based at least in part on comparing information included in a user profile to attributes of the corrupted segment of the media asset.

9. The method of claim 5, wherein the generating for display the summary comprises generating for display a textual version of the summary for a fixed period of time.

10. The method of claim 1, further comprising:

terminating a display of the first segment of the media asset;

transmitting, to the content source, a request for an uncorrupted copy of the first segment;

receiving, from the content source, a link to the uncorrupted copy of the first segment;

initiating, based on the link, a session for retrieving the uncorrupted copy of the first segment; and determining, based on the session, a retrieval period for retrieving the uncorrupted copy of the first segment.

11. A system comprising:

an input/output circuitry configured to generate segments of a media asset for display; and a control circuitry configured to:

receive, from a content source, a first segment of the media asset;

determine a start time of the first segment within the media asset;

within a period of time between a current playback time of the media asset and the start time:

extract a last frame from a second segment of the media asset that immediately precedes the first segment;

extract an initial frame from the first segment;

compare the last frame of the second segment to the initial frame of the first segment to determine a deviation between the last frame of the second segment to the initial frame of the first segment;

in response to determining that the deviation exceeds a threshold deviation, determine that the first segment of the media asset is a corrupted segment; and in response to determining that the first segment is the corrupted segment, perform an action for addressing the corrupted segment of the media asset.

12. The system of claim 11, wherein the control circuitry is configured to perform the action for addressing the corrupted segment by performing one of: generating for display an uncorrupted copy of the corrupted segment or generating for display a summary of the corrupted segment in an overlay.

13. The system of claim 11, wherein the control circuitry is further configured to:

determine whether a retrieval period to retrieve an uncorrupted portion of the media asset exceeds a threshold period;

based on determining that the retrieval period does not exceed the threshold period, retrieve and generate for display the uncorrupted portion of the media asset; and based on determining that the retrieval period exceeds the threshold period, generate for display a summary of the uncorrupted portion of the media asset.

14. The system of claim 13, wherein the control circuitry is further configured to determine the retrieval period by:

retrieving the uncorrupted portion of the first segment;

tracking a partial period taken to retrieve the uncorrupted portion;

determining a retrieval rate based on the partial period taken to retrieve the uncorrupted portion; and determining the retrieval period as an estimation for retrieving a remaining uncorrupted portion of the first segment according to the retrieval rate.

15. The system of claim 11, wherein the control circuitry is further configured to:

determine a summary for the corrupted segment based on a portion of retrieved subtitles;

determine an importance level of the corrupted segment based on the summary;

determine whether the importance level of the corrupted segment exceeds a threshold level; and based on determining that the importance level of the corrupted segment exceeds the threshold level, the input/output circuitry is further configured to:

generate for display the summary for the corrupted segment at a first time; and generating for display an uncorrupted segment of the media asset at a second time subsequent to the first time.

16. The system of claim 15, wherein the input/output circuitry is further configured to:

based on determining that the importance level of the corrupted segment does not exceed the threshold level:

generate for display the second segment of the media asset; and at a substantially same time as generating for display the second segment, generate for display the summary for the corrupted segment in an overlay on the second segment of the media asset.

17. The system of claim 15, wherein the control circuitry is further configured to:

determine a starting time index and an ending time index for the corrupted segment; and determine, from a subtitle component, the portion of the retrieved subtitles between the starting time index and the ending time index.

18. The system of claim 15, wherein the importance level of the corrupted segment of the media asset is determined based at least in part on comparing information included in a user profile to attributes of the corrupted segment of the media asset.

19. The system of claim 15, wherein the input/output circuitry is configured to generate for display the summary by generating for display a textual version of the summary for a fixed period of time.

20. The system of claim 11, wherein the input/output circuitry is further configured to:

terminate a display of the first segment of the media asset;

transmit, to the content source, a request for an uncorrupted copy of the first segment;

receive, from the content source, a link to the uncorrupted copy of the first segment;

initiate, based on the link, a session for retrieving the uncorrupted copy of the first segment, wherein the control circuitry is further configured to:

determine, based on the session, a retrieval period for retrieving the uncorrupted copy of the first segment.

\* \* \* \* \*